United States Patent
Takatori et al.

(10) Patent No.: US 7,969,918 B2
(45) Date of Patent: *Jun. 28, 2011

(54) SLAVE COMMUNICATION DEVICE FOR USE IN WIRELESS LAN SYSTEM AND CONTROL METHOD AND CONTROL PROGRAM OF SLAVE COMMUNICATION DEVICE

(75) Inventors: Sunao Takatori, Tokyo (JP); Hisanori Kiyomatsu, Tokyo (JP)

(73) Assignee: Daita Frontier Fund, LLC, Wilmington, DE (US)

(*) Notice: Subject to any disclaimer, the term of this patent is extended or adjusted under 35 U.S.C. 154(b) by 1454 days.

This patent is subject to a terminal disclaimer.

(21) Appl. No.: 10/221,748

(22) PCT Filed: Apr. 27, 2001

(86) PCT No.: PCT/JP01/03713
§ 371 (c)(1),
(2), (4) Date: Dec. 2, 2002

(87) PCT Pub. No.: WO02/082737
PCT Pub. Date: Oct. 17, 2002

(65) Prior Publication Data
US 2003/0125050 A1     Jul. 3, 2003

(30) Foreign Application Priority Data

Mar. 30, 2001 (JP) .......................... PCT/JP01/02747

(51) Int. Cl.
*H04L 12/16* (2006.01)
(52) U.S. Cl. ....... 370/270; 370/328; 370/338; 455/41.2; 455/500; 455/517
(58) Field of Classification Search .......... 370/311–313, 370/318, 338, 349, 270, 328; 455/41.2, 500, 455/517
See application file for complete search history.

(56) References Cited

U.S. PATENT DOCUMENTS 4,549,293 A   10/1985 Christian et al.
(Continued)

FOREIGN PATENT DOCUMENTS

CA   2133245   3/1995
(Continued)

OTHER PUBLICATIONS

IEEE 802. 75.4: A Developing Standardfor Low-Power Low-Cost Wireless Personal Area Networks; JA Gutierrez—IEEE Network, 2001.*

(Continued)

*Primary Examiner* — Salman Ahmed
(74) *Attorney, Agent, or Firm* — Sterne, Kessler, Goldstein & Fox, PLLC

(57) ABSTRACT

A slave communication device in a wireless LAN system uses a single wireless channel. When a telephone apparatus outside the network originates a call to the LAN, the originated call first terminates at a master communication device. A wireless telephone communication can then be established between that telephone apparatus and the slave communication device without relaying through the master communication device, and without requiring particular processing, such as authentication on a host station side. A first state is when a transmission/reception device of the master communication device is turned on and transmission/reception devices of slave communication devices are turned off. A second state is when the transmission/reception device of the master communication device is turned off and only the transmission/reception device of one of the slave communication devices which is a subject of control delegation is turned on.

29 Claims, 12 Drawing Sheets

U.S. PATENT DOCUMENTS

| | | | |
|---|---|---|---|
| 5,473,669 | A | 12/1995 | Kanada et al. |
| 5,907,491 | A * | 5/1999 | Canada et al. ............... 700/108 |
| 6,073,249 | A | 6/2000 | Watabe et al. |
| 6,377,825 | B1 * | 4/2002 | Kennedy et al. ........... 455/569.2 |
| 6,405,027 | B1 | 6/2002 | Bell |
| 6,445,730 | B1 * | 9/2002 | Greszczuk et al. ........... 375/219 |
| 6,501,942 | B1 | 12/2002 | Weissman et al. |
| 6,650,629 | B1 * | 11/2003 | Takahashi et al. ............ 370/335 |
| 6,711,380 | B1 * | 3/2004 | Callaway, Jr. ................ 455/41.2 |
| 6,745,038 | B2 * | 6/2004 | Callaway et al. ........... 455/456.1 |
| 6,763,231 | B2 | 7/2004 | Takatori et al. |
| 6,778,654 | B1 | 8/2004 | Takatori et al. |
| 6,795,421 | B1 * | 9/2004 | Heinonen et al. ............. 370/338 |
| 6,853,851 | B1 | 2/2005 | Rautiola et al. |
| 6,879,584 | B2 | 4/2005 | Thro et al. |
| 6,970,448 | B1 | 11/2005 | Sparrell et al. |
| 7,039,358 | B1 * | 5/2006 | Shellhammer et al. ...... 455/41.2 |
| 7,082,706 | B1 * | 8/2006 | Stinis et al. ..................... 40/213 |
| 7,155,264 | B2 * | 12/2006 | Twitchell, Jr. ................ 455/574 |
| 7,286,502 | B1 | 10/2007 | Rao et al. |
| 7,363,006 | B2 * | 4/2008 | Mooney ....................... 455/41.3 |
| 7,492,706 | B1 | 2/2009 | Parrish |
| 7,496,065 | B2 * | 2/2009 | Anjum et al. ................. 370/328 |
| 7,774,015 | B2 * | 8/2010 | Madine et al. ................ 455/522 |
| 2001/0018350 | A1 | 8/2001 | Hachimura et al. .......... 455/462 |
| 2002/0009983 | A1 * | 1/2002 | Pritchett et al. ............... 455/260 |
| 2002/0071477 | A1 | 6/2002 | Orava |
| 2002/0075940 | A1 * | 6/2002 | Haartsen ....................... 375/132 |
| 2002/0128037 | A1 * | 9/2002 | Schmidt ........................ 455/553 |
| 2002/0132582 | A1 * | 9/2002 | Mooney ........................... 455/41 |
| 2003/0012169 | A1 * | 1/2003 | Takatori et al. ............... 370/338 |
| 2003/0013440 | A1 * | 1/2003 | Takatori et al. ............... 455/422 |
| 2003/0099212 | A1 * | 5/2003 | Anjum et al. ................. 370/328 |
| 2003/0108019 | A1 * | 6/2003 | Takatori et al. ............... 370/338 |
| 2003/0125050 | A1 * | 7/2003 | Takatori et al. ............... 455/465 |
| 2003/0139137 | A1 * | 7/2003 | Takatori et al. ................. 455/41 |
| 2003/0179722 | A1 * | 9/2003 | Takatori et al. ............... 370/315 |
| 2003/0186717 | A1 * | 10/2003 | Takatori et al. ............... 455/519 |
| 2004/0014464 | A1 * | 1/2004 | Takatori et al. ............. 455/422.1 |
| 2004/0203356 | A1 * | 10/2004 | Takatori et al. ............... 455/41.1 |
| 2005/0276255 | A1 * | 12/2005 | Aiello et al. .................. 370/348 |
| 2006/0116129 | A1 | 6/2006 | Gorsuch |
| 2006/0183423 | A1 * | 8/2006 | Johansson et al. ........... 455/41.2 |
| 2006/0211372 | A1 | 9/2006 | Shellhammer et al. |
| 2007/0010285 | A1 * | 1/2007 | Schmidt ..................... 455/553.1 |
| 2007/0026852 | A1 * | 2/2007 | Logan et al. ................ 455/422.1 |
| 2008/0025277 | A1 * | 1/2008 | Takatori et al. ............... 370/338 |
| 2008/0139117 | A1 * | 6/2008 | Madine et al. ............... 455/41.2 |

FOREIGN PATENT DOCUMENTS

| | | |
|---|---|---|
| EP | 647077 A2 | 9/1993 |
| JP | 7-131842 | 5/1995 |
| JP | 2000-122791 | 6/2000 |
| JP | 2000-174899 | 6/2000 |
| JP | 2000-224656 | 8/2000 |
| JP | 2003-153213 | 5/2003 |
| WO | WO 02 082733 A1 | 10/2002 |
| WO | WO 02 082737 A1 | 10/2002 |
| WO | WO 02 082740 A1 | 10/2002 |

OTHER PUBLICATIONS

Enabling Wireless Connections using Bluetooth; from telenor.comJ Persson—TELEKTRONIKK, 2001.*

The Bluetooth Radio System; from psu.edu AHR Connectivity—IEEE Personal Communications, 2000.*

A Hybrid Architecture of Umts and Bluetooth for Indoor Wireless/mobile Communications; from psu.eduT Kwon, R Kapoor, Y Lee, M Gerla—2001.*

Nikkei Electronics, No. 761, Jan. 17, 2000, pp. 37-44.

International Search Report for Appln. No. PCT/JP2001/002747 issued Oct. 17, 2001, 2 pages.

International Search Report for Appln. No. PCT/JP2001/003713 issued Apr. 27, 2001, 2 pages.

International Search Report for Appln. No. PCT/JP2001/003989 issued Aug. 6, 2001, 2 pages.

Non-Final Office Action for U.S. Appl. No. 10/204,537, mailed Aug. 9, 2006, 8 pgs.

Non-Final Office Action for U.S. Appl. No. 11/704,234, mailed Feb. 27, 2009, 9 pgs.

Final Office Action for U.S. Appl. No. 11/704,234, filed Feb. 9, 2007, mailed Jul. 24, 2009, 37 pgs.

Non Final Office Action for U.S. Appl. No. 11/704,234, filed Feb. 9, 2007, mailed Jan. 4, 2010, 43 pgs.

* cited by examiner

SLAVE COMMUNICATION DEVICE FOR USE IN WIRELESS LAN SYSTEM AND CONTROL METHOD AND CONTROL PROGRAM OF SLAVE COMMUNICATION DEVICE

TECHNICAL FIELD

The present invention relates to a slave communication device, a control method of the slave communication device and the like for use in a wireless LAN system which connects a plurality of electronic apparatuses in a network through short-range wireless communication means, and more specifically, to a configuration, a control method and the like of the slave communication device which performs terminating from a telephone apparatus outside the network by receiving control delegation from a master communication device controlling the overall network to share a single wireless telephone line among the respective electronic apparatuses in the network.

BACKGROUND ART

The development of mobile communication telephones has been remarkable in recent years, and with a reduced telephone charge, release of new types of telephone and the like, the number of subscribers to telephone lines of mobile communication (hereinafter referred to as "wireless telephone line") exceeds the number of subscribers to fixed telephone lines under the present conditions. Thus, it is common practice for a user to have both of a portable telephone using a wireless telephone line and a fixed telephone using a fixed telephone line and to use them separately as required such that communication is performed with the fixed telephone indoors and communication is performed with the portable telephone while the user is out.

Reflecting such a situation, the number of subscribers to fixed telephone lines tends to decrease at present. Assuming that the usage charge (base rate and charge for calls) of telephone lines of mobile communication, communication speed, reliability of communication and the like will be further improved in the future and become approximately equal to those in fixed telephones, it is expected that the inevitability for a user to use a fixed telephone line is reduced considerably in the near future.

Also, on the other hand, it is expected that a communication function is added to a considerable number of electronic apparatuses (for example, television sets, VCRs, various kinds of cameras and the like) in the near future and various data can be transmitted and received to and from server devices or the like, and in this case, it is contemplated that a transmission/reception means for performing communication using a wireless telephone line is added to each of the electronic apparatuses. Here, when a case is assumed where a transmission/reception means using a wireless telephone line is added to various kinds of electronic apparatuses, if different wireless telephone lines are set for respective ones of the electronic apparatuses, that is, different telephone numbers are provided for respective ones, various problems arise such as unregulated creation of telephone numbers managed by users and host stations, bloating of base rate of wireless telephone lines charged to users, and even exhaustion of telephone number resources. It is thus necessary to construct a system in which a single wireless telephone line can be shared among a plurality of electronic apparatuses.

To construct such a system, a network connection through a LAN is conceivable. A proposed method is such that, for example, a short-range wireless communication device with Bluetooth (see Nikkei Electronics Jan. 17, 2000, pp. 37-44) or the like is mounted on each electronic apparatus to build a wireless LAN, and a call originated from a telephone apparatus outside the LAN is received by a master communication device such as a portable telephone for which a wireless telephone line is exclusively set in that wireless LAN to establish communication, and in the communication established state by the master communication device, each of the other electronic apparatuses (slave communication devices) in the wireless LAN performs communication with the master communication device through the short-range wireless device, thereby performing communication with the originating telephone apparatus through the master communication device.

In this method, however, only the portable telephone serving as the master communication device directly uses the wireless telephone line, and each of the other electronic apparatuses as the slave communication devices connects only indirectly to the wireless telephone line by using the portable telephone as a relay station without using the wireless telephone line.

Thus, since the master communication device must be continuously in a communication connection state during communication between a telephone apparatus outside the LAN and a slave communication device, unnecessary power consumption occurs. In addition, when a telephone apparatus outside the LAN is, for example, a computer such as a server device, and when a large amount of data such as video information transmitted from the computer is received by an electronic apparatus (slave communication device) in the wireless LAN, the portable telephone (master communication device) as the relay station bears an excessive amount of power consumption, and a burden of processing is excessive for performance of a microprocessor of a present portable telephone.

To address this, it is contemplated that that portable telephone is equipped with a battery of large capacity or a microprocessor capable of processing a large amount of data. Such a configuration, however, impairs the portability as the portable telephone and leads to a significant increase in cost, so that this is not practical.

In addition, since this method employs the portable telephone as the master communication device, an inconvenience is caused in that the portable telephone cannot be used on the move in order to perform communication between a telephone apparatus outside the LAN and an electronic apparatus (slave communication device). Thus, actually, besides the portable telephone, a wireless telephone line is required for providing each electronic apparatus in the wireless LAN with a mobile communication function.

On the other hand, in the current wireless telephone system, since a wireless telephone line is managed by a host station including a plurality of base stations and one central control station, location registration for a base station is required to use the wireless telephone line. Here, it is assumed to use a configuration in which a plurality of communication devices in the wireless LAN register their locations with the same telephone numbers, individually, the current host station cannot deal with this. Thus, to build a wireless LAN system using a wireless telephone line, the configuration which gives consideration to the issue of location registration of each communication device must be used.

As one strategy to solve such a problem, the present applicant has already proposed "Control Delegation System for Telephone Line" (Japan Patent Application 2000-122791, Japan Patent No. 3153213). When this system is applied to a wireless LAN using a wireless telephone line, each slave communication device uses a slave ID (for example, a telephone number "090-1234-5678-01," "090-1234-5678-02" . . . ) created on the basis of a master ID (for example, a telephone number "090-1234-5678") of a master communication device and individually performs communication through a host stations. Thus, after control delegation is received from the master communication device, it is possible to establish the wireless telephone line without using the master communication device as a relay station.

In the system proposed earlier, however, when each slave communication device which received control delegation uses a slave ID to perform wireless telephone communication to a telephone apparatus outside the LAN, the host station needs to authenticate the correspondence relationship between the slave ID and the master ID, causing a drawback of placing a burden of processing on the host station side (communication provider side).

DISCLOSURE OF THE INVENTION

It is an object of the present invention to provide a configuration, a control method, a control program and the like for a slave communication device in a wireless LAN system in which a single wireless channel is used, and when a telephone apparatus outside the network originates a call to the LAN, the originated call once terminates at the master communication device and wireless telephone communication can be established between that telephone apparatus and a slave communication device by themselves through a host station without relaying through the master communication device, and does not require particular processing such as authentication on the host station side.

The principal configuration of a slave communication device according to the present invention is a slave communication device for use in a wireless LAN system comprising electronic apparatuses in a network, each of the electronic apparatuses comprising, at least, short-range wireless communication means for performing transmission and reception of a radio signal among the respective electronic apparatuses in the network, transmission/reception means of a radio signal for performing communication using a wireless telephone line, and control means for controlling the short-range wireless communication means and the transmission/reception means, one of the respective electronic apparatuses serving as a master communication device and controlling the other respective electronic apparatuses as slave communication devices to share the wireless telephone line among the respective electronic apparatuses, characterized in that, to switch between a first state in normal times in which the transmission/reception means of the master communication device is turned on and the transmission/reception means of the respective slave communication devices are turned off and a second state at the time of control delegation in which the transmission/reception means of the master communication device is turned off and only the transmission/reception means of any one of the slave communication devices which is a subject of control delegation is turned on, the control means normally turns off the transmission/reception means to be in an output prohibited state in which output of a radio signal is prohibited, and turns on the transmission/reception means to enter an output permitted state in which a radio signal is output using the wireless telephone line when the short-range wireless communication means receives a terminating control delegation signal transmitted from the master communication device destined for itself in association with occurrence of a reason of terminating control delegation during wireless telephone communication between the master communication device and a telephone apparatus outside the network, and controls the transmission/reception means to again turn off the transmission/reception means to return to the output prohibited state when a control delegation completion reason occurs in the output permitted state.

The principal configuration of a method of controlling a slave communication device according to the present invention is a method of controlling a slave communication device for use in a wireless LAN system comprising electronic apparatuses in a network, each of the electronic apparatuses comprising, at least, short-range wireless communication means for performing transmission and reception of a radio signal among the respective electronic apparatuses in the network, and transmission/reception means of a radio signal for performing communication using a wireless telephone line, one of the respective electronic apparatuses serving as a master communication device and controlling the other respective electronic apparatuses as slave communication devices to share the wireless telephone line among the respective electronic apparatuses, characterized in that, to switch between a first state in normal times in which the transmission/reception means of the master communication device is turned on and the transmission/reception means of the respective slave communication devices are turned off and a second state at the time of control delegation in which the transmission/reception means of the master communication device is turned off and only the transmission/reception means of any one of the slave communication devices which is a subject of control delegation is turned on, the transmission/reception means is normally turned off to be in an output prohibited state in which output of a radio signal is prohibited, and the transmission/reception means is turned off to enter an output permitted state in which a radio signal is output using the wireless telephone line when the short-range wireless communication means receives a terminating control delegation signal transmitted from the master communication device destined for itself in association with occurrence of a reason of terminating control delegation during wireless telephone communication between the master communication device and a telephone apparatus outside the network, and the transmission/reception means is controlled to again turn off the transmission/reception means to return to the output prohibited state when a control delegation completion reason occurs in the output permitted state.

The principal configuration of a control program for a slave communication device according to the present invention is a control program for a slave communication device for use in a wireless LAN system comprising electronic apparatuses in a network, each of the electronic apparatuses comprising, at least, short-range wireless communication means for performing transmission and reception of a radio signal among the respective electronic apparatuses in the network, transmission/reception means of a radio signal for performing communication using a wireless telephone line, and control means for controlling the short-range wireless communication means and the transmission/reception means, one of the respective electronic apparatuses serving as a master communication device and controlling the other respective electronic apparatuses as slave communication devices to share the wireless telephone line among the respective electronic apparatuses, characterized in that, to switch between a first state in normal times in which the transmission/reception means of the master communication device is turned on and the transmission/reception means of the respective slave communication devices are turned off and a second state at the time of control delegation in which the transmission/reception means of the master communication device is turned off and only the transmission/reception means of any one of the slave communication devices which is a subject of control delegation is turned on, the control means is caused to serve as means for controlling the transmission/reception means to normally turn off to be in an output prohibited state in which output of a radio signal is prohibited, and to serve as means for controlling the transmission/reception means to turn on to enter an output permitted state in which a radio signal is output using the wireless telephone line when the short-range wireless communication means receives a terminating control delegation signal transmitted from the master communication device destined for itself in association with occurrence of a reason of terminating control delegation during wireless telephone communication between the master communication device and a telephone apparatus outside the network, and to serve as means for controlling the transmission/reception means to turn off to return to the output prohibited state when a control delegation completion reason occurs in the output permitted state.

DESCRIPTION OF THE REFERENCE NUMBERS

Figure 1:
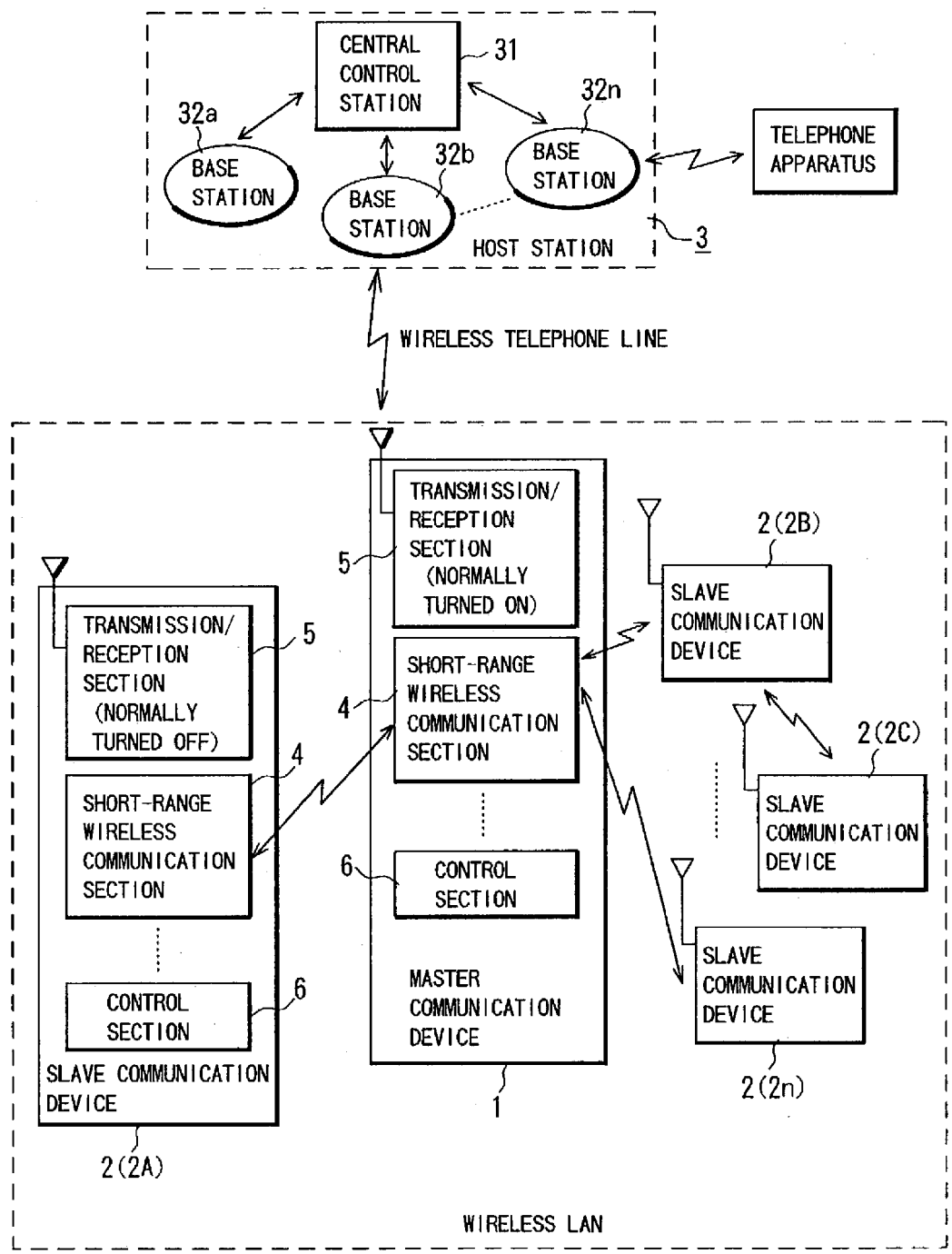
FIG. 1 is a diagram explaining basic principles and the like of the present invention and is a diagram showing a case where each device in a wireless LAN is in a first state.

1 master communication device
2(2A, 2B, 2C to 2n) slave communication device
3 host station
31 central control station
32(32a, 32b to 32n) base station
4 short-range wireless communication section (short-range wireless communication means)
5 transmission/reception section (transmission/reception means)
6 control section (control means)

BEST MODE FOR CARRYING OUT THE INVENTION

An embodiment of the present invention will be described in detail with reference to the drawings.

First, with reference to FIGS. 1 to 3, basic principles and the like of the present invention will be described.

The present invention is applied to a wireless LAN system in which a plurality of electronic apparatuses are connected in a network to perform short-range wireless communication among the respective electronic apparatuses through radio signals. As a hardware configuration for this, as shown in FIG. 1, each electronic apparatus comprises a short-range wireless communication section 4 as a short-range wireless communication means for transmitting and receiving radio signals among the respective electronic apparatuses in the network, a transmission/reception section 5 which is a transmission/reception means of radio signals for performing communication using a wireless telephone line, and a control section 6 as a control means for controlling the short-range wireless communication section 4 and the transmission/reception section 5.

Each short-range wireless communication section 4 provided for each electronic apparatus is for performing transmission and reception of various types of signals in a short range through radio signals such as radio waves and infrared rays, and is kept on-state in which radio signals can be transmitted and received to and from other short-range wireless communication sections 4 continuously during operation of the wireless LAN system.

Here, the respective electronic apparatuses in the network hold identifying information (for example, IP addresses, MAC addresses or the like) for identifying one another, and each identifying information is registered in a memory or the like, not shown, of each electronic apparatus. The data on the identifying information is included as destination information in a signal to be transmitted and received by the short-range wireless communication section 4, so that data, instructions or the like can be transmitted only to a particular electronic apparatus. Also, the data on the identifying information is included as originating information, thereby making it possible to identify from which electronic apparatus the signal has been transmitted.

Each short-range wireless communication section 4 functions as a transmission/reception means of a status signal indicating the state of each communication device, and as a means for transmitting a control delegation signal from a master communication device 1 to a slave communication device 2, and further, as a means for transmitting a request signal from the slave communication device 2 to the master communication device 1, and details thereof will be described later.

For radio signals transmitted and received by the respective short-range wireless communication sections 4, radio waves, infrared rays or the like can be used.

The transmission/reception section 5 provided for each electronic apparatus performs transmission and reception of radio signals for performing communication with various types of telephone apparatuses outside that wireless LAN system (outside the network) using a wireless telephone line.

The present invention is premised on application to an existing wireless telephone system. Thus, as shown in FIG. 1, the transmission/reception section 4 of each electronic apparatus in the LAN performs wireless telephone communication to a telephone apparatus outside the network through an existing host station 3 which manages the wireless telephone line. Although detailed description is omitted, the host station 31 comprises a single central control station 31 and a plurality of base stations 32 (32a to 32n) such that the base stations 32 perform processing on location registration for the wireless telephone line and the central control station 31 performs processing such as management of the ID (telephone number) of the wireless telephone line and line connection between telephone apparatuses.

The control section 6 of each electronic apparatus controls the short-range wireless communication section 4 and transmission/reception section 5 while performing various types of processing based on a control program. Details on the controlled contents of the control section 6 will be described later.

In addition, although not shown, each electronic apparatus is provided, as user interfaces, with an operation input section such as key switches for supplying an operation input signal to the control section 6, a display section such as an LCD for displaying the state and the like of the electronic apparatus, for settings of the operations of the short-range wireless communication section 4 and the transmission/reception section 5, the convenience of users and the like. These operation input section and display section may have configurations which use key switches, an LCD and the like appendant to the electronic apparatus, or may have configurations which can be remotely operated by using a remote control or the like.

In addition, since the present invention premises that the aforementioned various types of electronic apparatuses (such as television sets, VCRs, personal computers, and various types of in-home electrical appliances) are connected in a network, various means are provided for realizing respective functions of those electronic apparatuses.

In the present invention, one of the plurality of electronic apparatuses in the network serves as the master communication device 1 and governs the other respective electronic apparatuses as the slave communication devices 2 (2A, 2B, 2C, . . . , 2n) to share the single wireless telephone line among the respective electronic apparatuses. Then, each slave communication device 2 temporarily utilizes the wireless telephone line based on a control delegation signal transmitted from the short-range wireless communication section 4 of the master communication device 1.

More specifically, the present invention is configured to set the single wireless telephone line in the network, and thus, an ID (telephone number) for using the wireless telephone line by the transmission/reception section 5 is stored at least in a memory, not shown, of the master communication device 1.

Then, each slave communication device 2 normally turns off the transmission/reception section 5, and turns on the transmission/reception section 5 to enter a state in which it can utilize the wireless telephone line by receiving a control delegation signal transmitted to itself from the master communication device 1 at the short-range wireless communication section 4. Specifically, the control delegation signal is a signal which permits the transmission/reception section 5 of the slave communication device to be turned on, and the specific details thereof will be described later.

Here, "turn-off" of the transmission/reception section 5 refers to entering a state in which the transmission/reception section 5 is prohibited from outputting at least a radio signal for location registration, and can be realized, for example, by prohibiting power supply to the transmission/reception section 5. On the other hand, "turn-on" of the transmission/reception section 5 refers to entering a state in which the prohibition of output of a radio signal for location registration is removed to allow the use of the wireless telephone line. The meanings of the turn-off and turn-on of the transmission/reception section 5 are commonly used with the respective slave communication devices 2 and the master communication device 1.

It should be noted that while embodiments of the present invention are broadly divided into the case of a configuration in which the ID (telephone number) for using the wireless telephone line by the transmission/reception section 5 is always stored only in the memory of the master communication device 1 and not stored in the memories of the slave communication devices 2, and the case of a configuration in which the same ID (telephone number) is always stored in the memories of the respective communication devices 1, 2, the following embodiment will be described for the case of a configuration in which the ID is always stored only in the memory of the master communication device 1.

Next, a specific control example will be described with reference to a flow chart in FIG. 2. In an initial state and a normal state of the wireless LAN system, the respective transmission/reception sections 5 are controlled such that only the transmission/reception section 5 of the master communication device 1 is turned on and all the transmission/reception sections 5 of the respective slave communication devices 2 are turned off (step S1).

To establish this state, the master communication device 1 may perform control to turn off the transmission/reception sections 5 of the respective slave communication devices 2 in the network through the short-range wireless communication section 4, or on the side of each slave communication device 2, control may be performed to autonomously turn off the local transmission/reception section 5 until a control delegation signal is received.

In the following embodiment, in consideration of the possibility of poor communication or the like of the short-range wireless communication section 4, description will be made for an example of control when on the side of each slave communication device 2, the transmission/reception section 5 is autonomously turned off until a control delegation signal is received.

In the state (first state) shown in FIG. 1, only the transmission/reception section 5 of the master communication device 1 is turned on to perform location registration for a base station 32 (a base station 32b in FIG. 1) of the said host station 3, which means that only the master communication device 1 can perform origination and termination of an unspecified telephone apparatus outside the network.

In this first state, the master communication device 1 determines by the control section 6 the presence or absence of occurrence of a control delegation reason to a predetermined single slave communication device of the respective slave communication devices 2 (2A to 2n) (step S2), and when it is determined that a control delegation reason occurs, the master communication device 1 turns off the transmission/reception section 5 and transmits a control delegation signal from the short-range wireless communication section 4 destined for the predetermined single slave communication device 2 of the respective communication devices for switching to a second state in which only the transmission/reception section 5 of that slave communication device 2 is turned on (step S3).

Here, times of occurrence of a control delegation reason are broadly divided into the case of occurrence during standby for origination and termination of the master communication device 1 in the first state (in the case of originating control delegation, later described) and the case of occurrence during communication between the master communication device 1 and an unspecified telephone apparatus outside the network (in the case of terminating control delegation, later described).

Figure 3:
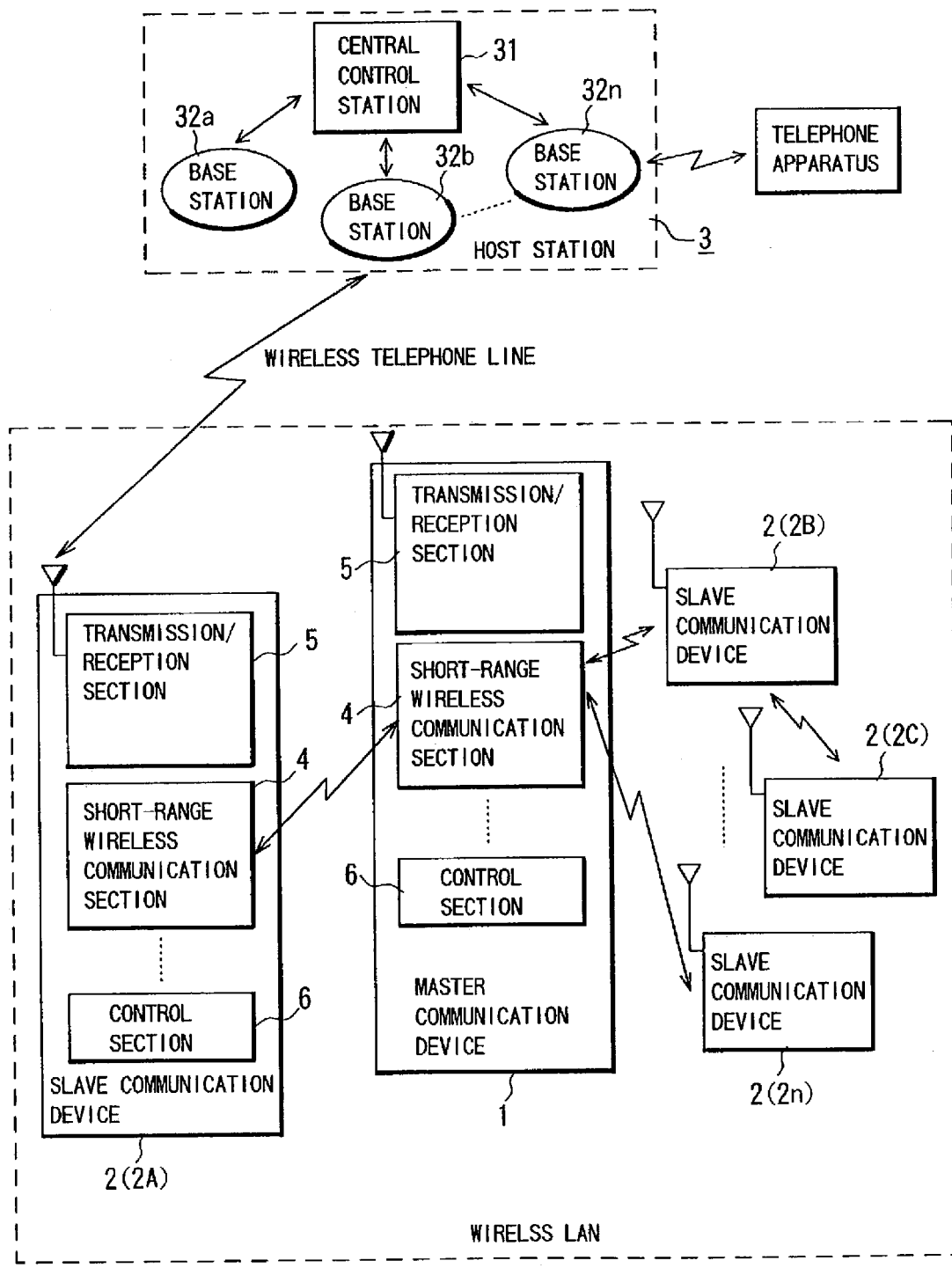
FIG. 3 is a diagram explaining basic principles and the like of the present invention and is a diagram showing a case where each device in the wireless LAN is in a second state.

FIG. 3 shows the states of the respective communication devices 1, 2 in the second state. As shown in FIG. 3, in the second state, only the transmission/reception section 5 of the single slave communication device 2 (the slave communication device 2A in FIG. 3) which received the control delegation signal from the master communication device 1 is turned on to perform location registration for the base station 32b of the said host station 3, and only this slave communication device 2A can perform origination and termination of an unspecified telephone apparatus outside the LAN.

Then, in this second state, the single slave communication device 2 on which control delegation has been performed is monitored for the presence or absence of occurrence of a control delegation completion reason (step S4), and if a control delegation completion reason occurs, the master communication device 1 and that slave communication device 2 perform control processing for switching to the first state shown in FIG. 1 (step S5). Incidentally, a specific example of the control delegation completion reason will be described later.

The control for returning from the second state to the first state at step S5 includes control processing of switching the transmission/reception section 5 of the slave communication device 2 which is a subject of control delegation from turn-on to turn-off, processing of detecting by the master communication device 1 that the transmission/reception section 5 is turned off, and control processing of switching the transmission/reception section 5 of the master communication device 1 from turn-off to turn-on.

In this manner, the present invention is configured to control the respective transmission/reception means 5 such that switching is performed between the first state in normal times in which the transmission/reception section 5 of the master communication device 1 is turned on and the transmission/reception sections 5 of the respective slave communication devices 2 are turned off and the second state at the time of control delegation in which the transmission/reception section 5 of the master communication device 1 is turned off and, in association with occurrence of a control delegation reason to any slave communication device, only the transmission/reception section 5 of the predetermined single slave communication device 2 is turned on, so that only the transmission/reception section 5 of a single communication device is turned on at all times. Thus, while a single wireless telephone line is shared between the respective communication devices 1, 2, simultaneous use thereof is avoided, and particular processing is not produced such as authentication on the side of the host station 3 (the communication provider side) and solution of the problem concerning location registration is achieved.

Next, specific controlled contents and the like in the wireless LAN system to which present invention is applied will be described in detail with reference to FIGS. 4 to 12.

First, from the viewpoint of the aforementioned times of occurrence of a control delegation reason (step S2 in FIG. 2) and a communication mode of a slave communication device which received control delegation, broad division can be made into a case where any slave communication device 2 receives control delegation during standby for origination and termination of the master communication device 1 in the first state to enter the second state in which that slave communication device 2 performs originating to a telephone apparatus outside the LAN, and a case in which any slave communication device 2 receives control delegation during communication between the master communication device 1 and an unspecified telephone apparatus outside the network in the first state to enter the second state in which that telephone apparatus and that slave communication device 2 establish communication. Thus, for the convenience of description, a difference in control contents and the like, the control delegation in the former case is referred to as "originating control delegation" and the control delegation in the latter case is referred to as "termination control delegation," and both of them will be separately described in the following.

Figure 4:
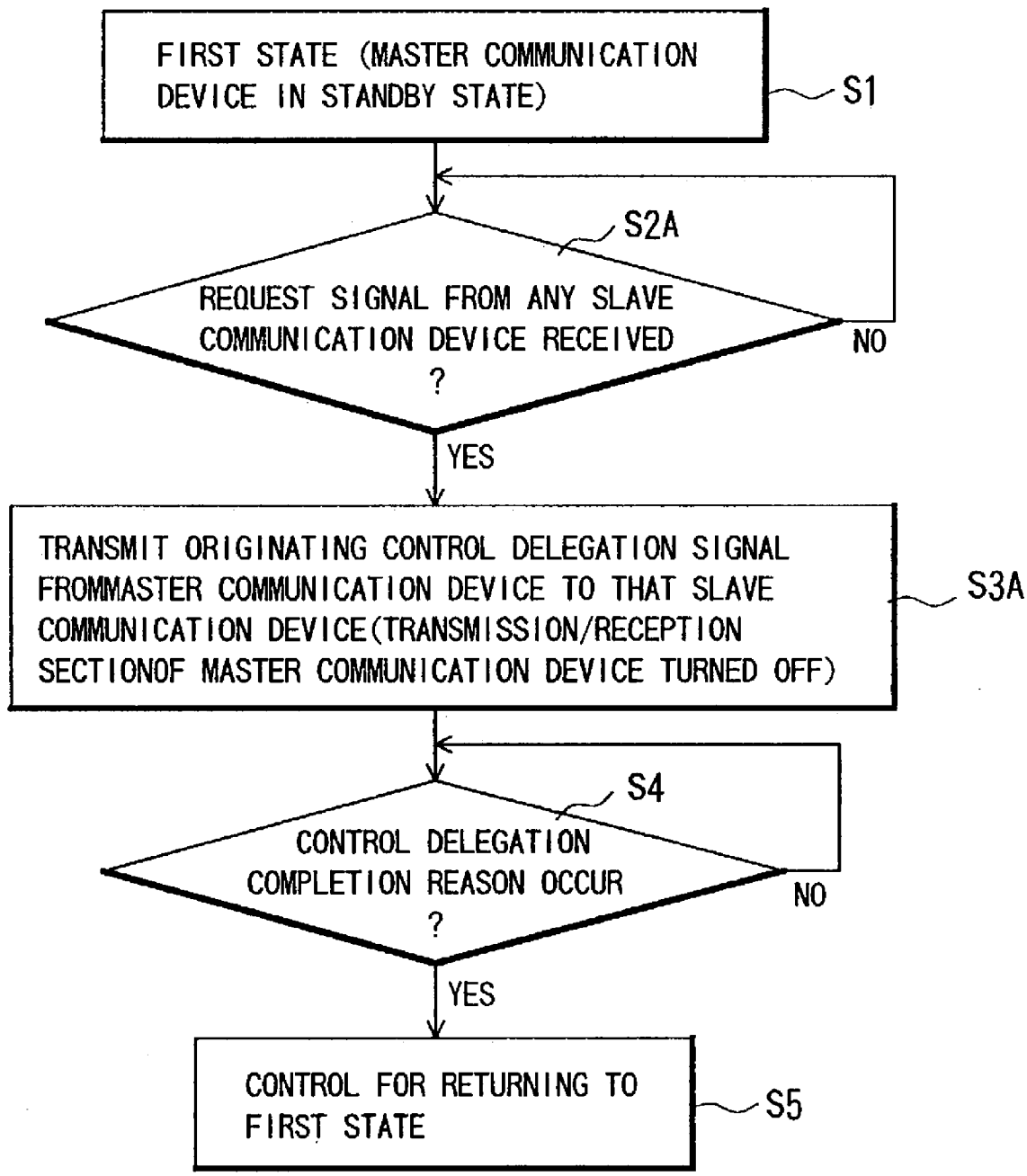
FIG. 4 is a flow chart explaining an overview of processing in an overall system when a slave communication device which received originating control delegation from a master communication device performs originating by itself to a telephone apparatus outside the network.

FIG. 4 shows an overview of processing in the overall system when any slave communication device 2 receives control delegation (originating control delegation) from the master communication device 1 to perform originating to a telephone apparatus outside the LAN. In this case, in the first state in which only the transmission/reception section 5 of the master communication device 1 is turned on (step S1), the control section 6 of the master communication device 1 monitors reception of a request signal for requesting originating control delegation from any slave communication device 2 at the short-range wireless communication section 4 of the master communication device 1 (step S2A), and upon reception of the request signal, considers that a control delegation reason (originating control delegation reason) described at step S2 in FIG. 2 occurs, and transmits an originating control delegation signal from the short-range wireless communication section 4 of the master communication device 1 to that slave communication device 2 and performs control to turn off the transmission/reception section 5 of the master communication device 1 (step S3A).

Here, the request signal includes, for example, the aforementioned destination information and originating information such as a MAC address, a signal indicating that originating control delegation is required, and the like.

Also, the originating control delegation signal includes, for example, the aforementioned destination information and originating information such as a MAC address, information on the ID (telephone number) of the master communication device 1, an instruction for permitting the transmission/reception section 5 of the slave communication device 2 to be turned on for originating, and the like. Thus, the slave communication device 2, which received the originating control delegation signal destined for itself at the short-range wireless communication section 4, can turn on the transmission/reception section 5 to use the wireless telephone line based on the received ID. In addition, the switching between turn-on and turn-off of the transmission/reception sections 5 of the master communication device 1 and that slave communication section 2 causes the overall system to be switched from the first state to the second state.

In this second state, since only the transmission/reception section 5 of the single slave communication device 2 which is the originating of the request signal is turned on to perform location registration for the host station 3 (base station 32b in FIG. 3), it is in a state in which the slave communication device 2 can perform originating by itself without relaying through the master communication device 1, and a problem such as an increased burden of processing on the host station 3 can be avoided.

When the transmission/reception section 5 is turned on and location registration for the base station 32b is performed, the slave communication device 2, which received originating control delegation, starts originating destined for the intended telephone number of the destination based on operations and the like on the operation input section by a user.

Here, the instruction, information and the like included in the originating control delegation signal can impose limitations or the like on the wireless telephone communication function of the slave communication device 2 which received the originating control delegation signal.

For example, control delegation only for originating is set by including, in the originating control delegation signal, an instruction for prohibiting termination at the transmission/reception section 5 of the slave communication device. Even when an unspecified telephone apparatus outside the network originates a call to the LAN (to the telephone number of the master communication device) during the originating operation of the slave communication device 2 which received originating control delegation, the reception of this originated call can be refused not to hinder the originating operation of the user.

Also, the originating control delegation signal including an instruction for limiting originating destinations from the slave communication device can limit originating destinations from the transmission/reception section 5 of the slave communication device 2 to a predetermined range.

For example, a telephone number (for example, for international telephone calls with a high charge, dial Q2 service or the like) to which originating is prohibited is registered in a predetermined memory of the master communication device 1, and information on this telephone number and an instruction for prohibiting origination to this telephone number are included at the transmission of the originating control delegation signal, thereby making it possible to prevent the slave communication device 2 from performing originating to a predetermined telephone number.

Then, in the second state, the presence or absence of occurrence of a control delegation completion reason is monitored for that slave communication device 2 (step S4), and when it is determined that a control delegation completion reason occurs, the aforementioned control for returning to the first state is performed (step S5) to return to the initial state.

Figure 5:
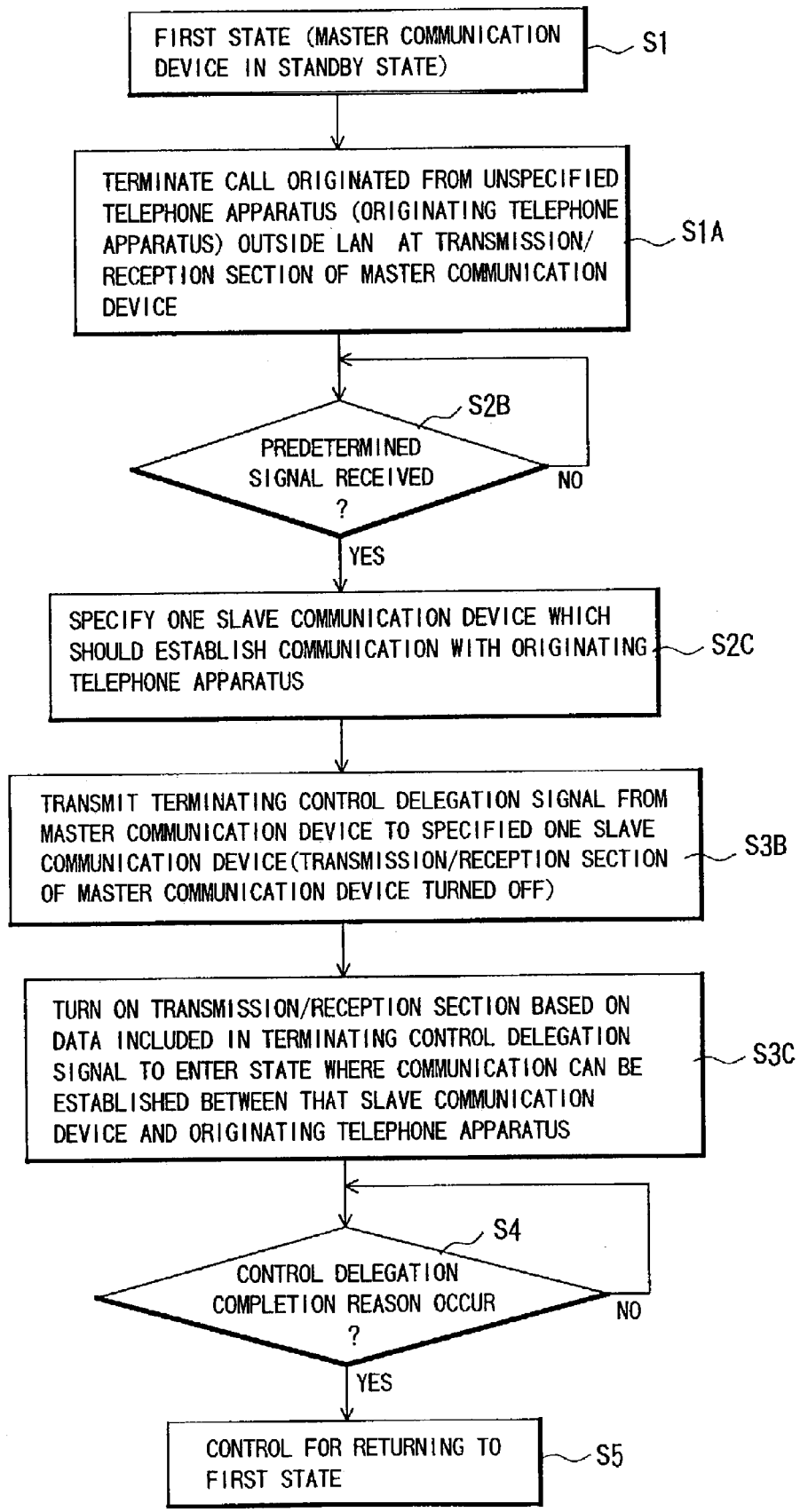
FIG. 5 is a flow chart explaining an overview of processing in the overall system when the slave communication device which received terminating control delegation from the master communication device performs wireless telephone communication with a telephone apparatus outside the network.

FIG. 5 shows an outline of processing of the overall system when any slave communication device 2 receives control delegation (terminating control delegation) from the master communication device 1 during communication between a telephone apparatus outside the network and the master communication device 1 through the wireless telephone line to perform communication between that slave communication device 2 and the telephone apparatus outside the network.

In this case, in the first state in which only the transmission/reception section 5 of the master communication device 1 is turned on (step S1), the transmission/reception section 5 of the master communication device 1 receives a call originated from an unspecified telephone apparatus (originating telephone apparatus) outside the network (step S1A) to start communication. In the state of communication with the originating telephone apparatus, the control section 6 of the master communication device 1 determines whether or not a predetermined signal for specifying any slave communication device 2 is received (step S2B).

This predetermined signal is a signal serving as a trigger for specifying a slave communication device which is a subject of terminating control delegation, and includes, for example, a signal such as an ID (hereinafter referred to as "slave ID") indicating a slave communication device and transmitted from the originating telephone apparatus, an operation input signal for terminating control delegation by operating the operation input section (such as key switches) of the master communication device 1 based on conversation and the like between the user of the originating telephone apparatus and the user of the master communication device 1, and the like.

Here, the master communication device 1 may determine the presence or absence of the reception of the slave ID by monitoring a signal received at the transmission/reception section 5 and may determine the presence or absence of the reception of the operation input signal by monitoring a signal received from the operation input section. Also, for the slave ID, for example, different numbers (for example, 01, 02, 03 . . . ) are previously assigned as slave IDs to the slave communication devices 2A to 2n, respectively, and these slave IDs may be stored in a memory or the like in correspondence to identifying information such as MAC addresses of the respective slave communication devices 2A to 2n managed by the master communication device 1.

Figure 2:
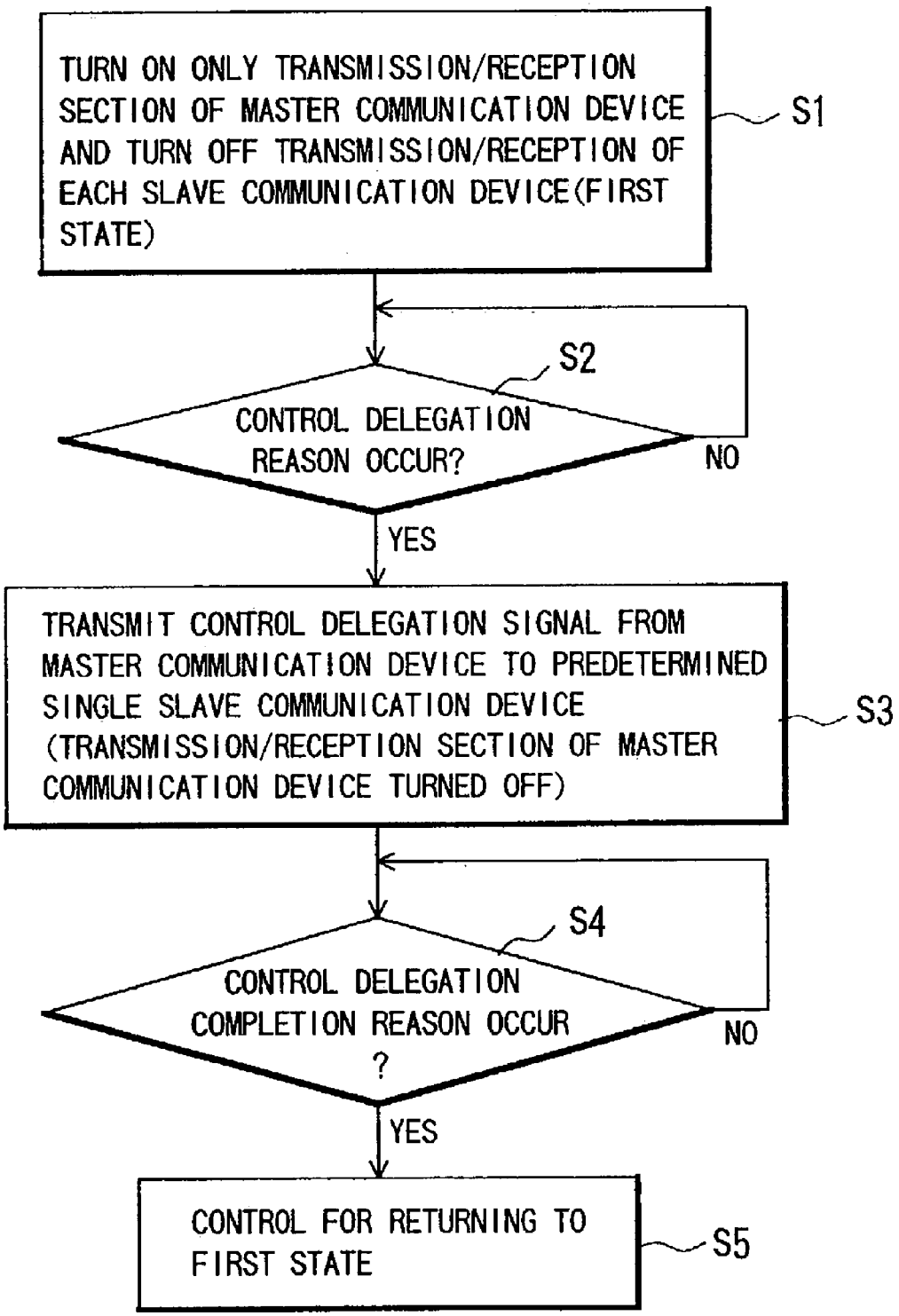
FIG. 2 is a flow chart explaining basic principles and the like of the present invention.

Then, upon input of this predetermined signal, the control section 6 of the master communication device 1 considers that a control delegation reason (terminating control delegation reason) described at step S2 in FIG. 2 occurs, specifies a single slave communication device which should establish communication with the originating telephone apparatus (step S2C), and transmits a terminating control delegation signal from the short-range wireless communication section 4 of the master communication device 1 to the specified single slave communication device 2 and performs control to turn off the transmission/reception section 5 (step S3B).

Here, the terminating control delegation signal includes, for example, the aforementioned destination information and originating information such as a MAC address, information on the ID (telephone number) of the master communication device 1, an instruction for permitting the transmission/reception section 5 of the slave communication device 2 to be turned on, and the like. Thus, the slave communication device 2, which received the terminating control delegation signal destined for itself at the short-range wireless communication section 4, can turn on the transmission/reception section 5 to use the wireless telephone line based on the received ID. Also, the switching between turn-on and turn-off of the transmission/reception sections 5 of the master communication device 1 and that slave communication device 2 causes the overall system to be switched from the first state to the second state, thereby once terminating the communication between the originating telephone apparatus and the master communication device 1.

In the second state, since only the transmission/reception section 5 of the single slave communication device 2 which received the terminating control delegation signal is turned on to perform location registration for the host station (base station 32b in FIG. 3), it is in a state in which, when the originating telephone apparatus again originates a call destined for the LAN (destined for the telephone number of the master communication device 1), this originated call can be directly terminated by the transmission/reception section 5 of the slave communication device 2 without relaying through the master communication device 1, and a problem such as an increased burden of processing on the host station can be avoided.

The slave communication device 2 which received the terminating control delegation signal performs processing for setting a state in which communication can be established with the originating telephone apparatus based on each information included in the terminating control delegation signal (step S3C).

Here, the instruction, information and the like included in the terminating control delegation signal can impose limitations or the like on the wireless telephone communication function of the slave communication device 2 which received the terminating control delegation signal.

For example, control delegation only for termination is set by including, in the terminating control delegation signal, an instruction for prohibiting originating by the transmission/reception section 5 of the slave communication device. When the originating telephone apparatus again originates a call destined for the LAN (destined for the telephone number of the master communication device 1), this originated call can be immediately terminated by the transmission/reception section 5 of the slave communication device 2.

Also, for example, the terminating control delegation signal includes the information on the telephone number of the originating telephone apparatus and an instruction for permitting termination of a call only from this originating telephone apparatus, and when another telephone apparatus outside the LAN originates a call destined for the LAN during standby for termination of the slave communication device 2 which received the terminating control delegation, it is possible not to prevent the terminating standby state for the originating telephone apparatus without terminating that originated call by the slave communication device 2.

In addition, for example, the information on the telephone number of the originating telephone apparatus and an instruction for permitting originating to this originating telephone number (or an instruction that originating should be performed) are, included in the terminating control delegation signal, thereby making it possible to perform originating based on the originating operation of a user or automatically perform originating destined for the originating telephone apparatus from the slave communication device 2 which received the terminating control delegation.

Then, in the second state, the presence or absence of occurrence of a control delegation completion reason is monitored for that slave communication device 2 (step S4), and when it is determined that a control delegation completion reason occurs, the aforementioned control for returning to the first state is performed (step S5) to return to the initial state.

Next, control processing performed by the control section 6 of the master communication device 1 will be described focusing on the case of originating control delegation with reference to a flow chart in FIG. 6.

The control section 6 of the master communication device 1 controls the transmission/reception section 5 to turn on the transmission/reception section 5 in the initial state (step S1), and performs location registration for the host station (base station 32b in FIG. 1).

Subsequently, the control section 6 of the master communication device 1 performs the processing of monitoring a signal received at the short-range wireless communication section 4 to determine whether or not a request signal is received from a slave communication device 2 (step S2A), the processing of monitoring a signal received at the transmission/reception section 5 to determine whether or not a call originated from a telephone apparatus outside the LAN is received (terminates) (step 13), and the processing of monitoring a signal input from the operation input section to determine whether or not originating is performed to a telephone apparatus outside the LAN (step S14), and the determinations at step S2A, step S13, and step S14 are repeated until any of the determination results in "yes."

Here, the processing is moved to step S15 when it is determined that a request signal is received, to step S21 when it is determined that there is a termination, or to step S25 when it is determined that originating is performed, respectively.

At step S15, the control section 6 of the master communication device 1 controls the short-range wireless communication section 4 to transmit an originating control delegation signal destined for the slave communication device 2 which is the originating of the request signal, and controls the transmission/reception section 5 to turn off the transmission/reception section 5 (step S16). Then, the control section 6 of the master communication device 1 controls the short-range wireless communication section 4 to transmit a status signal indicating that the transmission/reception section 5 is turned off to the respective slave communication devices when the transmission/reception section 5 is turned off (step S17).

Thereafter, the slave communication device 2, which received the originating control delegation signal, turns on the transmission/reception section 5 to make transition from the first state to the second state.

Then, the control section 6 of the master communication device 1 monitors a signal received at the short-range wireless communication section 4, specifically a status signal sent from the slave communication device 2 to which the originating control has been delegated, to perform monitoring of the state, operation and the like of the transmission/reception section 5 of that slave communication device, and checks as appropriate whether or not the transition to the second state has been performed, whether or not the slave communication device 2 to which control has been delegated has performed originating, and the like.

This embodiment is configured to determine the presence or absence of occurrence of a control delegation completion reason (step S4 in FIG. 4) by both of the control section 6 of the slave communication device 2 and the control section 6 of the master communication device 1. If a control delegation completion reason occurs, the control section 6 of the slave communication device 2 turns off its own transmission/reception section 5 and transmits a status signal indicating that fact from the short-range wireless communication section 4 to the respective communication devices.

Thus, the control section 6 of the master communication device 1 monitors whether or not the transmission/reception section 5 of the slave communication device 2 to which control has been delegated is turned off in the second state (step S18), and upon reception of a status signal indicating that it is turned off at the short-range wireless communication section 4, considers that a control delegation completion reason occurs and performs control to turn on its own transmission/reception section 5 (step S19), and controls the short-range wireless communication section 4 to transmit a status signal indicating that it is turned on to the respective slave communication devices 2A to 2n (step S20), then returns to the processing in the loop of determinations of step S2A, step S13, and step S14.

On the other hand, when a call originated from a telephone apparatus outside the LAN is received (terminates) at the transmission/reception section 5, the control section 6 of the master communication device 1 controls the short-range wireless communication section 4 to transmit a status signal indicating that the termination is being made (that it exits the standby state) to the respective slave communication devices 2 (step S21), and performs various types of processing for establishing communication with the originating telephone apparatus to move to a communication state (step S22). While the processing of the terminating control delegation described in FIG. 5 is performed during this communication state, the processing performed by the control section 6 of the master communication device 1 in the terminating control delegation will be described later in FIG. 8.

In the state of communication with the originating telephone apparatus, the control section 6 of the master communication device 1 monitors a received signal or the like at the transmission/reception section 5 to determine whether or not the communication with the originating telephone apparatus is completed (step S23), and when it is determined that the communication is completed, controls the short-range wireless communication section 4 to transmit a status signal indicating that fact (that it again enters the standby state) to the respective slave communication devices (step S24), then returns to the processing in the loop of determinations of step S2A, step S13, and step S14.

In addition, when the master communication device 1 performs originating to a telephone apparatus outside the LAN, the control section 6 of the master communication device 1 controls the short-range wireless communication section 4 to transmit a status signal indicating that originating is being performed (that it exits the standby state) (step S25), and performs various types of processing for establishing communication with a telephone apparatus on the destination side to move to a communication state (step S26).

Incidentally, the processing of the terminating control delegation described in FIG. 5 can be also performed during the communication state at step S26, and in this case, the processing (step S51 in FIG. 8) of information on the telephone number of the telephone apparatus on the destination acquired by the master communication device 1 is not required.

In the communication state at step S26, the control section 6 of the master communication device 1 monitors a received signal or the like at the transmission/reception section 5 to determine whether or not the communication with the telephone apparatus on the destination side is completed (step S27), and when it is determined that the communication is completed, controls the short-range wireless communication section 4 to transmit a status signal indicating that fact (that it again enters the standby state) to the respective slave communication devices 2A to 2n (step S28), then returns to the processing in the loop of determinations of step S2A, step S13, and step S14.

Next, control processing performed by the control section 6 of the slave communication device 2 will be described focusing on the case of originating control delegation with reference to a flow chart in FIG. 7.

The control section 6 of the slave communication device 2 controls the transmission/reception section 5 to turn off the transmission/reception section 5 in the initial state upon power-up (step S1). In this embodiment, prohibiting power supply to the transmission/reception section 5 at step S1 achieves low power consumption.

Subsequently, the control section 6 of the slave communication device 2 performs processing of monitoring a signal received at the short-range wireless communication section 4 to determine whether or not a terminating control delegation signal is received from the master communication device 1 (step S32), processing of monitoring a signal input from the operation input section to determine whether or not a trigger signal for transmitting a request signal to the master communication device 1 is input (step S33), and the determinations at step S32 and step S33 are repeated until any of the determinations results in "yes."

Figure 9:
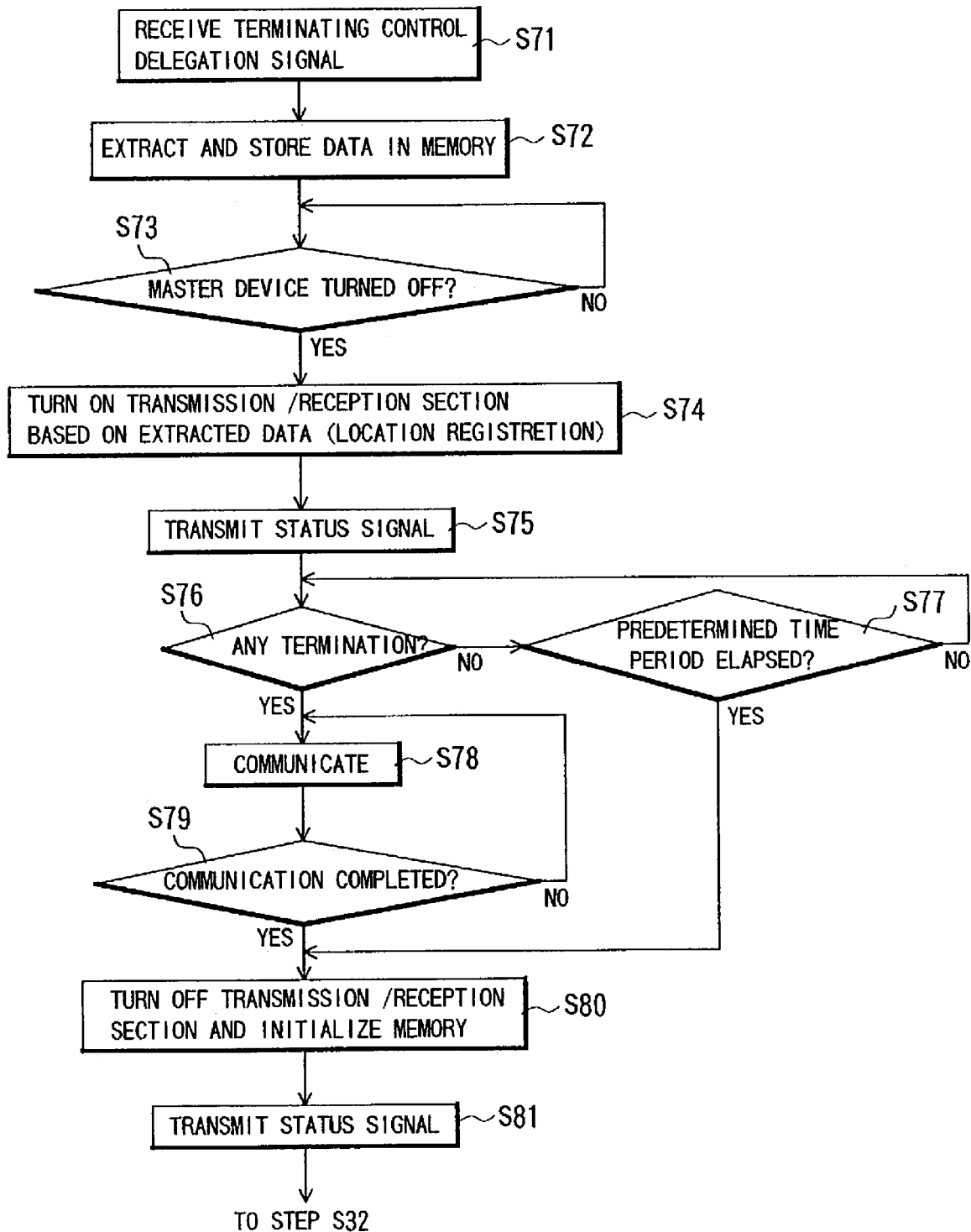
FIG. 9 is a flow chart explaining processing at the time of terminating control delegation performed by the slave communication device.

Here, processing of terminating control delegation, later described in FIG. 9, is performed when it is determined that a terminating control delegation signal is received, and transition is made to step S34 when it is determined that a trigger signal is input.

Figure 6:
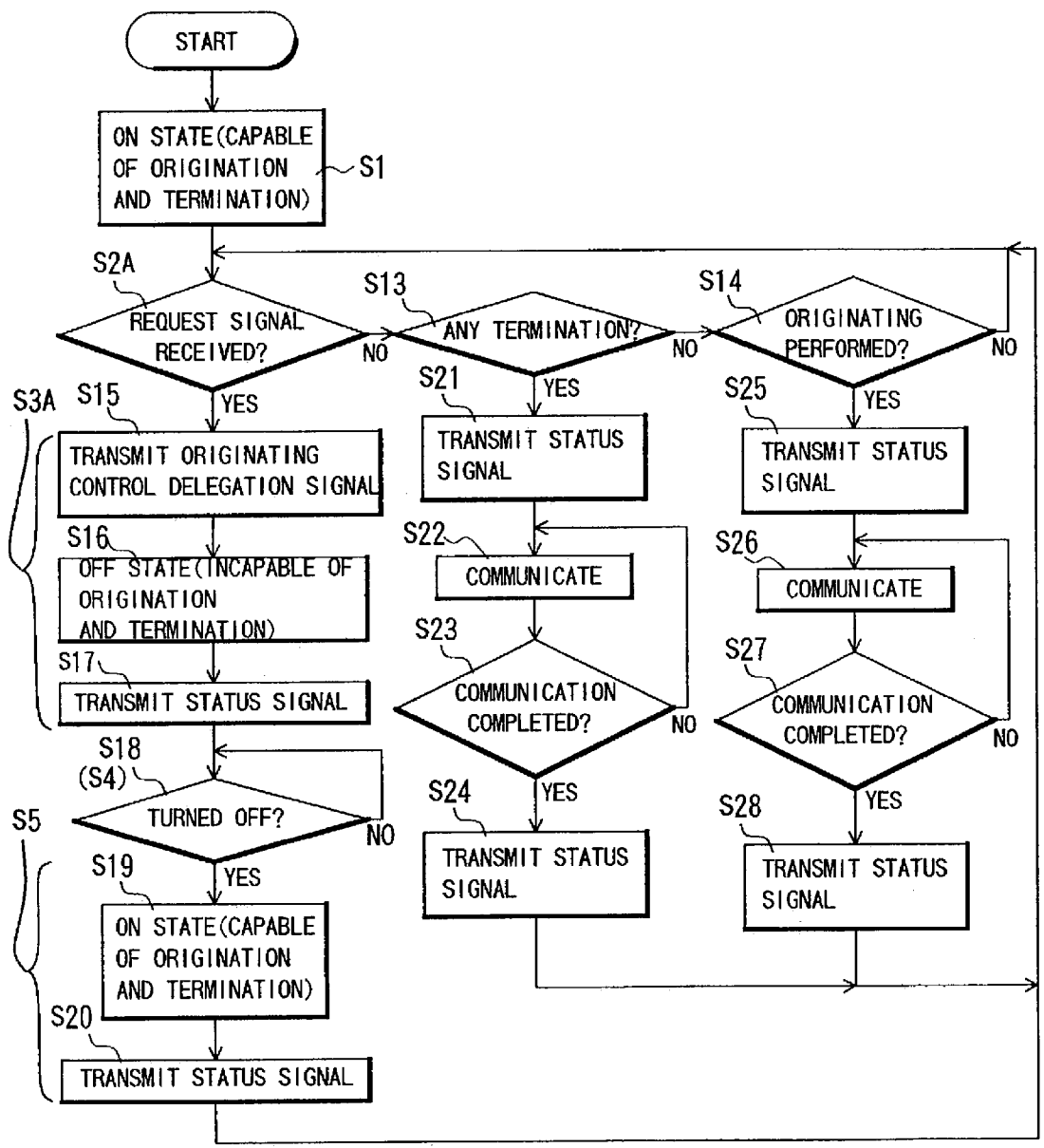
FIG. 6 is a flow chart for explaining an overview of control processing performed by a control section of the master communication device and processing of originating control delegation.

When a trigger signal is input, the control section 6 of the slave communication device 2 checks a signal received at the short-range wireless communication section 4, specifically a status signal from the master communication device 1, to determine whether or not the master communication device 1 is in a standby state (a state in the loop of determinations of step S2A to step S14 in FIG. 6), and when it is not in a standby state, considers that the master communication device 1 is using the wireless telephone line or control delegation to another slave communication device 2 is being performed, and displays an error display on a display section (step S35), then returns to the loop of determinations of step S32 and step S33.

On the other hand, when the master communication device 1 is in a standby state, the control section 6 of the slave communication device 2 controls the short-range wireless communication section 4 to transmit a request signal to the master communication device 1 (step S36) and monitors a signal received at the short-range wireless communication section 4 to wait until an originating control delegation signal is received from the master communication device 1 (step S37). Then, upon reception of an originating control delegation signal, the control section 6 of the slave communication device 2 extracts data (various types of information or instructions) included in the originating control delegation signal and stores it as appropriate in a memory (such as a RAM in the control section 6) (step S38).

Subsequently, the control section 6 of the slave communication device 2 monitors a signal received at the short-range wireless communication section 4 (a status signal from the master communication device 1) to wait until the transmission/reception section 5 of the master communication device 1 is turned off (step S39), and when it is turned off, controls its own transmission/reception section 5 to turn on the transmission/reception section 5 (step S40), and controls the short-range wireless communication section 4 to transmit a status signal indicating that its own transmission/reception section 5 is turned on to the master communication device 1 and the other slave communication devices 2 (step S41).

Then, the control section 6 of the slave communication device 2 monitors a signal input from the operation input section to determine whether or not a trigger signal for performing originating to a telephone apparatus on the destination side outside the LAN is input (step S42), and when a trigger signal is input, controls the transmission/reception section 5 to perform originating to the telephone apparatus on the destination side and establish communication (step S44).

Also, during communication with the telephone apparatus on the destination side, the control section 6 of the slave communication device 2 monitors a received signal or the like at the transmission/reception section 5 to determine whether or not the communication is completed (step S45), and when it is determined that the communication is completed, considers that a control delegation completion reason at step S4 in FIG. 4 occurs to turn off the transmission/reception section 5 and performs processing of erasing the various types of information or instructions stored in the memory at step S38 for initialization (step S46).

Then, when the transmission/reception section 5 is turned off, the control section 6 of the slave communication device 2 controls the short-range wireless communication section 4 to transmit a status signal indicating that the transmission/reception section 5 is turned off to the master communication device 1 and the other slave communication devices 2 (step S47), and returns to the loop of determinations of step S32 and step S33.

On the other hand, the control section 6 of the slave communication section 2 monitors whether or not a predetermined time period has elapsed during no input of a trigger signal for performing originating to a telephone apparatus on the destination side outside the LAN (step S43), and when the predetermined time period has elapsed, considers that a control delegation completion reason at step S4 in FIG. 4 occurs and performs the aforementioned processing at step S46 and step S7, and then returns to the loop of determinations of step S32 and step S33.

In the present embodiment, the provision of such processing at step S43 can prevent such a situation that the slave communication device 2 which has received originating control delegation does not perform originating continuously to make it impossible to use the transmission/reception section 5 of the master communication device 1 in a long time without returning to the first state. Also, in the present embodiment, since that slave communication device 2 itself makes a determination of the presence or absence of occurrence of a control delegation completion reason after originating control delegation to perform control for switching the transmission/reception section 5 from turn-on to turn-off, a processing burden on the side of the master communication device 1 is reduced.

Furthermore, for example, even when the communication state with the master communication device 1 by the short-range wireless communication section 4 is interrupted by any chance after originating control delegation, the slave communication device 2 can autonomously turn off the transmission/reception section 5.

Figure 7:
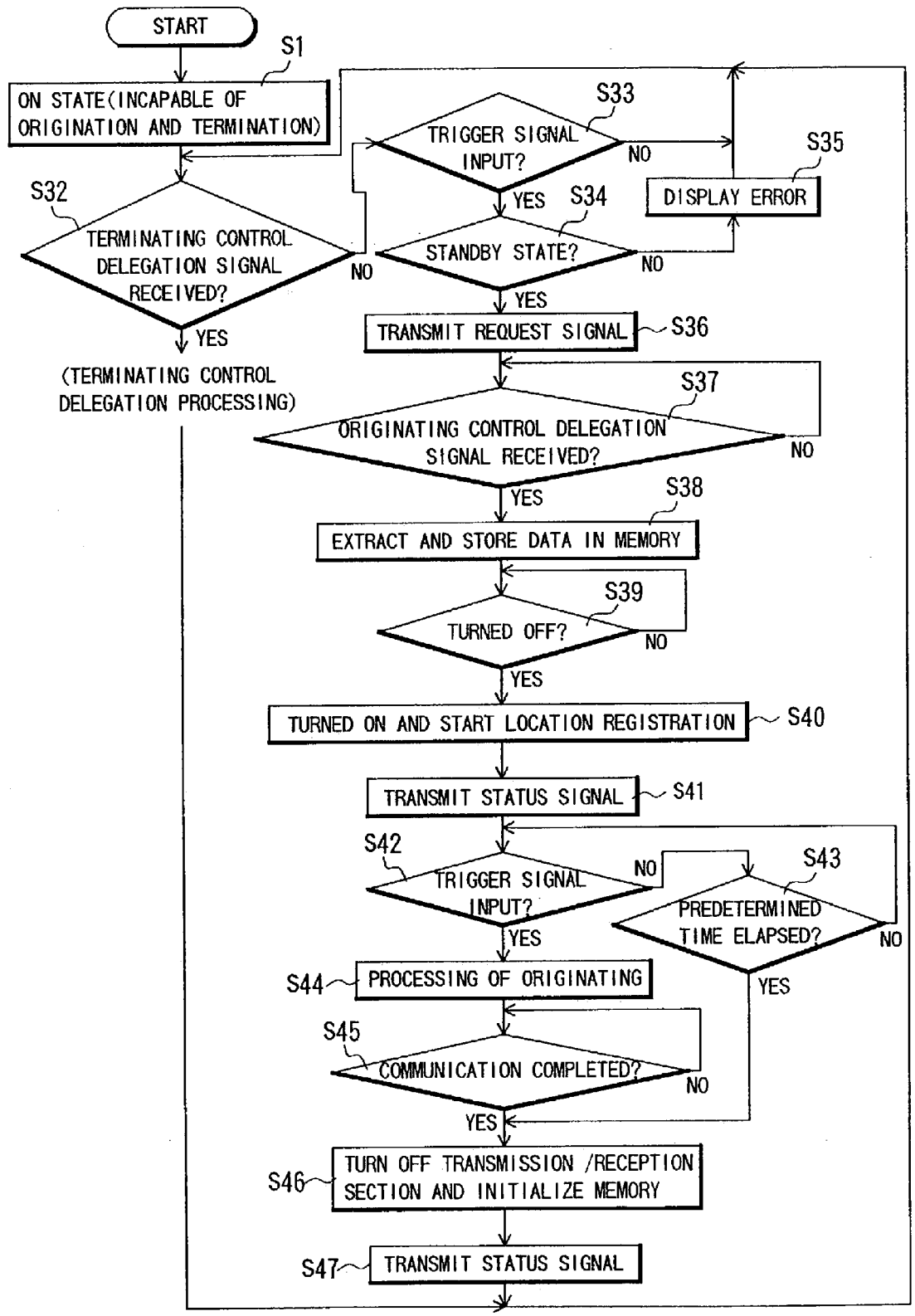
FIG. 7 is a flow chart for explaining control processing performed by a control section of the slave communication device in originating control delegation.
Figure 10:
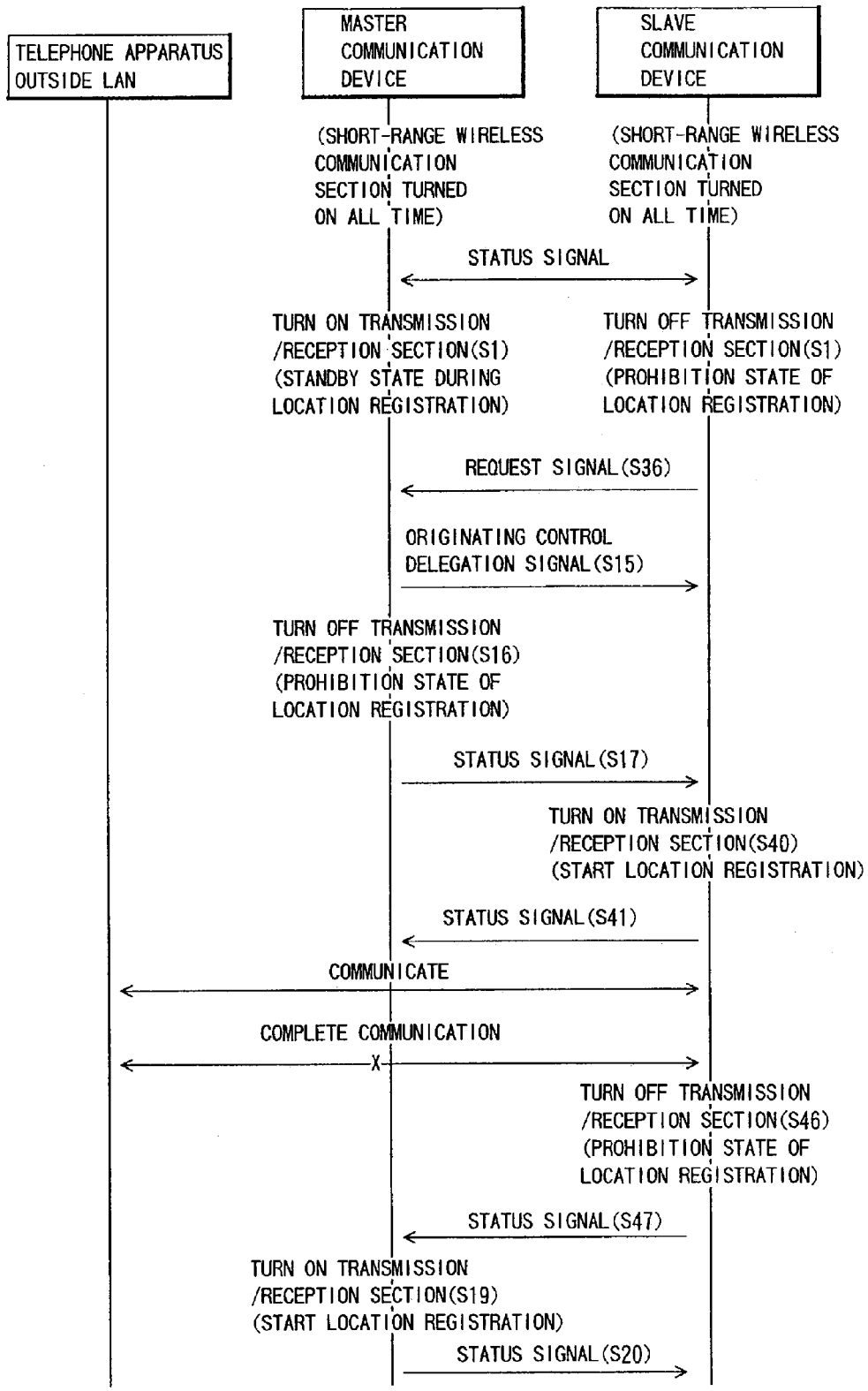
FIG. 10 is a diagram illustrating a flow of a signal and the like when the master communication device performs originating control delegation to the slave communication device.

FIG. 10 shows a flow of a signal and the like when the master communication device 1 delegates originating control to the slave communication device 2 based on each processing in FIG. 6 and FIG. 7.

As seen from FIG. 10, the present embodiment is configured to control the respective transmission/reception sections 5 such that, at the switching from the first state to the second state, the transmission/reception section 5 of the slave communication device 2 which received originating control delegation is turned on after waiting until the transmission/reception section 5 of the master communication device 1 is turned off, while at the switching from the second state to the first state, the transmission/reception section 5 of the master communication device 1 is turned on after waiting until the transmission/reception section 5 of the slave communication device 2 which received originating control delegation is turned off. Thus, the situation in which two or more transmission/reception sections 5 are simultaneously turned on is avoided to smoothly perform switching between the first state and the second state.

Next, control processing for terminating control delegation performed by the control section 6 of the master communication device 1 will be described with reference to a flow chart in FIG. 8. Incidentally, in the flow chart in FIG. 8, step S51 to step S54 are processing performed in the state of communication (at step S12 in FIG. 6) with an originating telephone apparatus outside the LAN, and step S55 to step S59 show processing for switching between the first state and the second state. Also, processing corresponding to the processing in FIG. 6 is designated with the same step number.

The control section 6 of the master communication device 1 stores the telephone number of an originating telephone apparatus in an internal memory and the like at the time of communication connection or during communication with the originating telephone apparatus (step S51).

Also, the control section 6 of the master communication device 1 monitors a signal received at the transmission/reception section 5 during the communication with the originating telephone apparatus to monitor whether or not a signal (for example, the aforementioned slave ID or the like) specifying a slave communication device is transmitted from the originating telephone apparatus (step S52) and whether or not the communication with the originating telephone apparatus is completed (step S23 in FIG. 6), and when the communication is completed without receiving a signal specifying a slave communication device, transmits the status signal at step S24 in FIG. 6 from the short-range wireless communication section 4 to return to the standby state(steps S2A to S14 in FIG. 6), and when a signal specifying a slave communication device is received at the transmission/reception section 5, transition is made to step S53.

The control section 6 of the master communication device 1 controls the short-range wireless communication section 4 to transmit a terminating control delegation signal destined for the slave communication device 2 which is to be specified at step S53, and monitors a signal received at the transmission/reception section 5 to determine whether or not the communication with the originating telephone apparatus is completed (step S54), and upon completion of the communication with the originating telephone apparatus, turns off the transmission/reception section 5 (step S55), and transmits a status signal indicating that it is turned off from the short-range wireless communication section 4 to the respective slave communication devices 2 (step S56).

Thereafter, since the first state moves to the second state by the slave communication device 2 which received the terminating control delegation signal turning on the transmission/reception section 5, the control section 6 of the master communication device 1 monitors a signal received at the short-range wireless communication section 4, specifically a status signal transmitted from the slave communication device 2 to which the terminating control has been delegated to monitor the state, operation and the like of the transmission/reception section 5 of that slave communication device, and as appropriate, checks whether or not transition to the second state has been performed, whether communication is established between the slave communication device 2 to which control has been delegated and the originating telephone apparatus, and the like.

The present embodiment is configured to determine the presence or absence of occurrence of a control delegation completion reason (step S4 in FIG. 4) by both of the control section 6 of the slave communication device 2 and the control section 6 of the master communication device 1.

If a control delegation completion reason occurs, the control section 6 of the slave communication device 2 turns off its own transmission/reception section 5 to transmit a status signal indicating that fact from the short-range wireless communication section 4.

Thus, the control section 6 of the master communication device 1 monitors whether or not the transmission/reception section 5 of the slave communication device 2 to which control has been delegated is turned off in the second state (step S57), and upon reception of a status signal indicating that it is turned off at the short-range wireless communication section 4, considers that a control delegation completion reason occurs and performs control to turn on its own transmission/reception section 5 (step S58), and controls the short-range wireless communication section 4 to transmit a status signal indicating that it is turned on destined for the respective slave communication devices (step S59), then returns to the loop (standby state) of determinations of step S2A, step S13, and step S14 in FIG. 6.

Incidentally, as apparent from comparison with FIG. 6, since basic processing (step S55 to step S59) after the completion of the communication with the originating telephone apparatus in the terminating control delegation can be realized by processing similar to step S16 to step S20 in FIG. 6 in the originating control delegation, simplification of a program or the like is achieved.

Also, as described above, this processing in FIG. 8 can be also performed when the master communication device 1 performs originating to a telephone apparatus outside the LAN (step S26 in FIG. 6), and in this case, the originating telephone apparatus may be read as a telephone apparatus on the destination side, and step S23 as step S27, step S24 as step S28, respectively.

Next, control processing performed by the control section 6 of the slave communication device 2 at the time of the terminating control delegation will be described with reference to a flow chart in FIG. 9. Incidentally, FIG. 9 shows control processing performed by the control section 6 of the slave communication device 2 after it is determined that the terminating control delegation signal is received at step S32A in FIG. 7.

When the control section 6 of the slave communication device 2 receives the terminating control delegation signal at the short-range wireless communication device 4 (step S71), it extracts data (various type of information or instructions) included in the terminating control delegation signal and stores it as appropriate in a memory (such as RAM in the control section 6) (step S72).

Subsequently, the control section 6 of the slave communication device 2 monitors a signal (a status signal from the master communication device 1) received at the short-range wireless communication section 4 to wait until the transmission/reception section 5 of the master communication device 1 is turned off (step S73), and when it is turned off, controls its own transmission/reception section 5 to turn on the transmission/reception section 5 based on the extracted data (step S74), and controls the short-range wireless communication section 4 to transmit a status signal indicating that its own transmission/reception section 5 is turned on to the master communication device 1 and the other slave communication devices 2 (step S75).

Thus, the overall system is switched from the first state to the second state in which the transmission/reception section 5 of the slave communication device 2 performs location registration for the host station (base station).

Then, the control section 6 of the slave communication device 2 monitors a signal received at the transmission/reception section 5 to determine whether or not termination has been made (step S76), and when a signal indicating termination is received, controls the transmission/reception section 5 to connect communication with the originating telephone apparatus automatically or after it waits for operation on the operation input section (step S78).

Also, during the communication with the originating telephone apparatus, the control section 6 of the slave communication device 2 monitors a received signal or the like at the transmission/reception section 5 to determine whether or not the communication is completed (step S79), and when it is determined that the communication is completed, considers that a control delegation completion reason at step S4 in FIG. 4 occurs, and turns off the transmission/reception section 5 and performs processing of erasing the various types of information or instructions stored in the memory at the foregoing step S72 (step S80).

Then, when the transmission/reception section 5 is turned off, the control section 6 of the slave communication device 2 controls the short-range wireless communication section 4 to transmit a status signal indicating that fact to the master communication device 1 and the other slave communication devices 2 (step S81), and returns to the loop of determinations of step S32 and step S33 in FIG. 7.

On the other hand, while a signal indicating termination is not received at the transmission/reception section 5, the control section 6 of the slave communication device 2 monitors whether or not a predetermined time period has elapsed (step S77), and when the predetermined time period has elapsed, considers that a control delegation completion reason occurs at step S4 in FIG. 4 to perform the aforementioned processing at step S80 and step S81, and then returns to the loop of determinations at step S32 and step S33 in FIG. 7.

In the present embodiment, the provision of such processing at step S77 can prevent such a situation that a signal indicating termination cannot be received continuously at the transmission/reception section 5, for example due to a trouble on the side of the originating telephone apparatus or host station 3, to make it impossible to use the transmission/reception section 5 of the master communication device 1 for a long time without returning to the first state.

Also, in the present embodiment, since that slave communication device 2 itself makes a determination of the presence or absence of occurrence of a control delegation completion reason after the terminating control delegation to perform control for switching the transmission/reception section 5 from turn-on to turn-off, a processing burden on the side of the master communication device 1 is reduced. Furthermore, for example, even when the communication state with the master communication device 1 by the short-range wireless communication section 4 is interrupted by any chance after the terminating control delegation, the slave communication device 2 can autonomously turn off the transmission/reception section 5.

Figure 8:
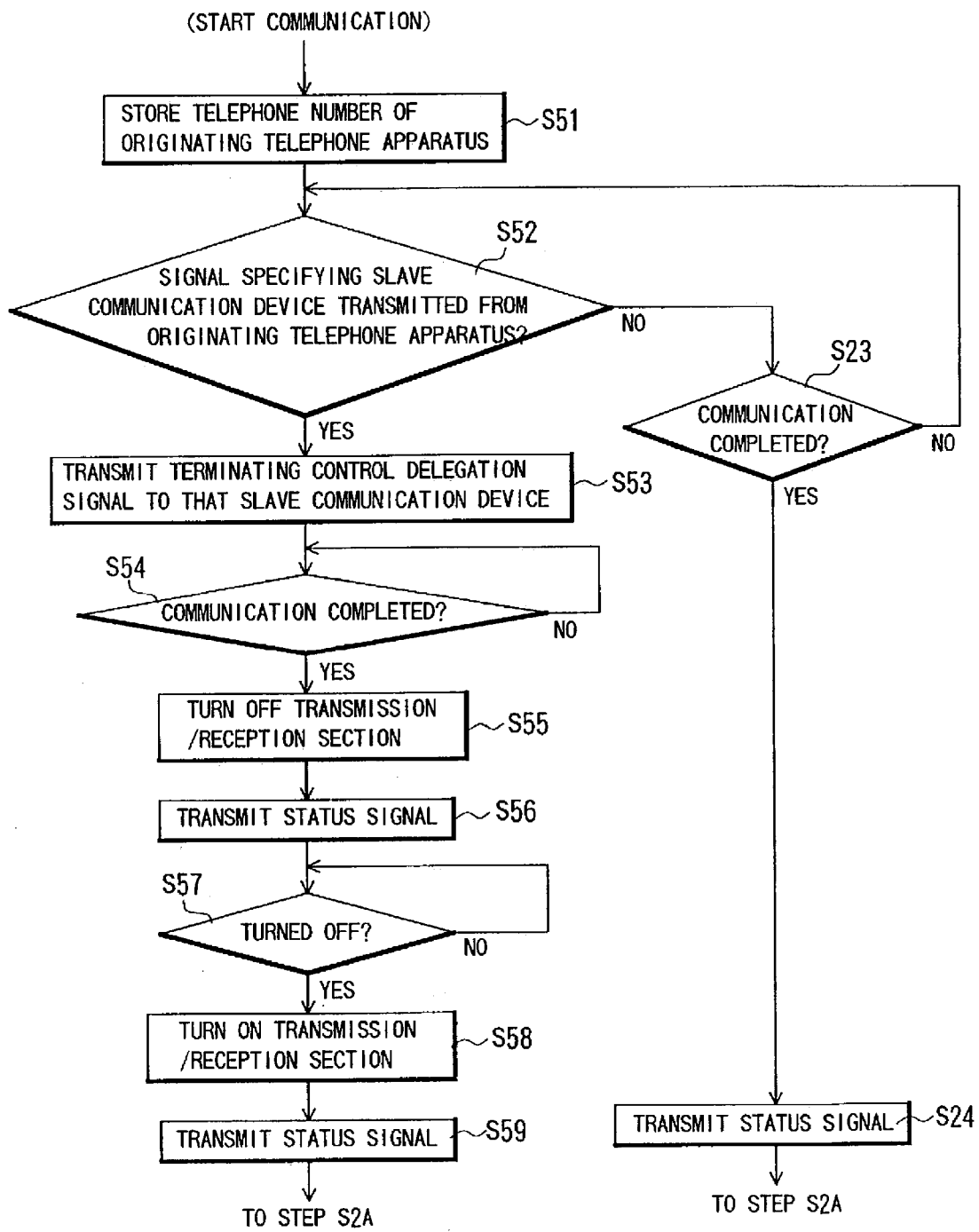
FIG. 8 is a flow chart explaining processing of terminating control delegation performed by the master communication device and illustrates processing performed in a communication state with an originating telephone apparatus and processing for switching between the first state and the second state.
Figure 11:
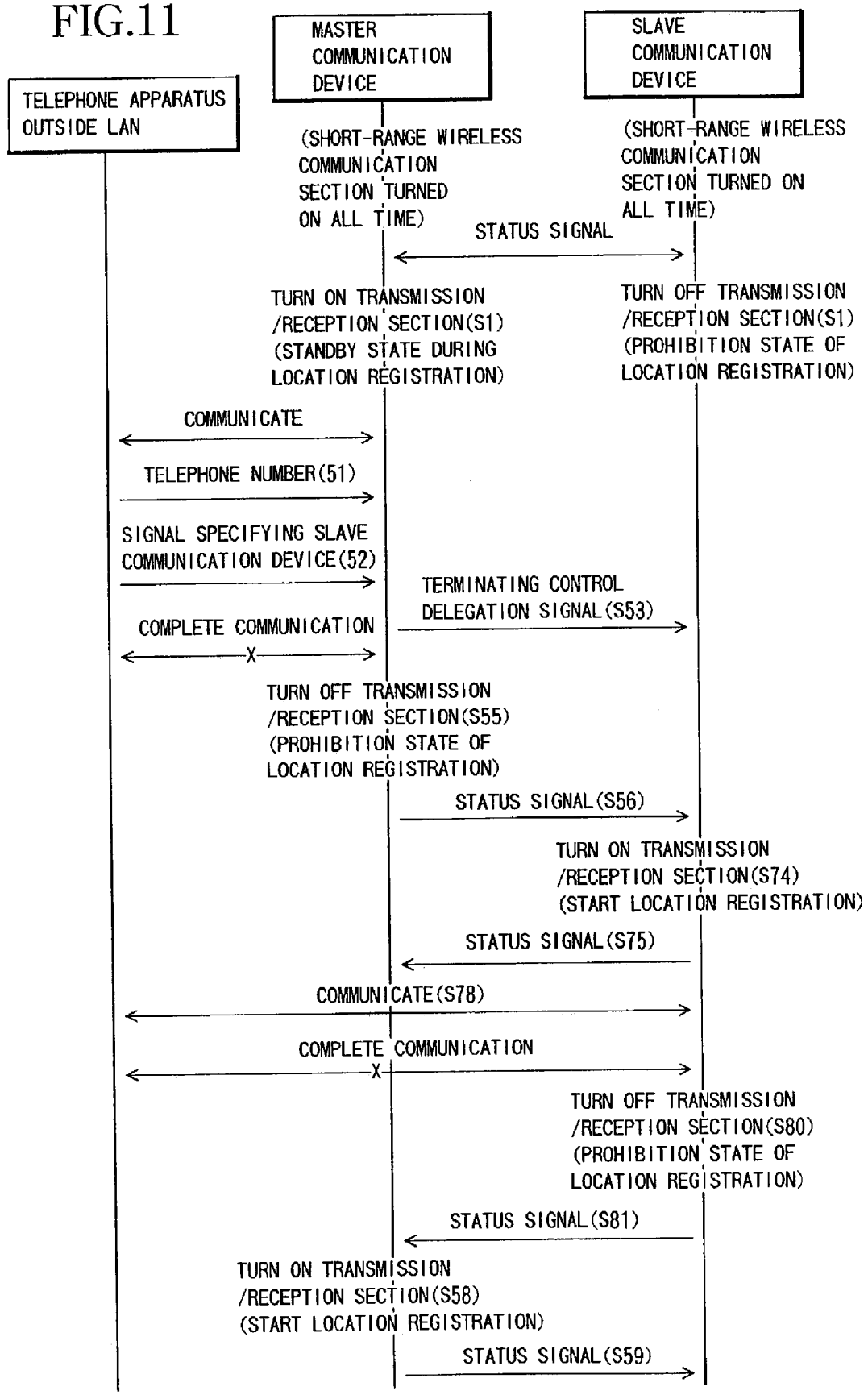
FIG. 11 is a diagram illustrating a flow of a signal and the like when the master communication device performs terminating control delegation to the slave communication device.

FIG. 11 shows a flow and the like of a signal when the master communication device 1 delegates terminating control to the slave communication device 2 based on each processing in FIG. 8 and FIG. 9.

As seen from FIG. 11, the present embodiment is configured to control the respective transmission/reception sections 5 such that, at the switching from the first state to the second state, the transmission/reception section 5 of the slave communication device 2 which received terminating control delegation is turned on after waiting until the transmission/reception section 5 of the master communication device 1 is turned off, while at the switching from the second state to the first state, the transmission/reception section 5 of the master communication device 1 is turned on after waiting until the transmission/reception section 5 of the slave communication device 2 which received terminating control delegation is turned off. Thus, the situation in which two or more transmission/reception sections 5 are simultaneously turned on is avoided to smoothly switch between the first state and the second state.

While the aforementioned embodiment has been described for the configuration in which the ID (telephone number) for using the wireless telephone line is set only for the master communication device 1 and not set for the slave communication devices 2, the configuration may have the same ID (telephone number) set for the respective communication devices 1, 2, that is, the configuration may have the said ID always stored in memories or the like of the slave communication devices 2.

In this case, on the side of the master communication device 1, when a control delegation signal is transmitted to the slave communication device 2, transmission including the ID of the wireless telephone line is not required.

Also, while the aforementioned embodiment has been described for a case where the master communication device 1 receives a request signal from the slave communication device 2 about occurrence of an originating control delegation reason, it goes without saying that the said originating control delegation reason may occur, without being limited to the aforementioned case, by specifying any of the slave communication devices on the operation input section of the master communication device 1 to perform operation input for originating control delegation during a standby state for origination and termination of the master communication device 1 in the first state.

Figure 12:
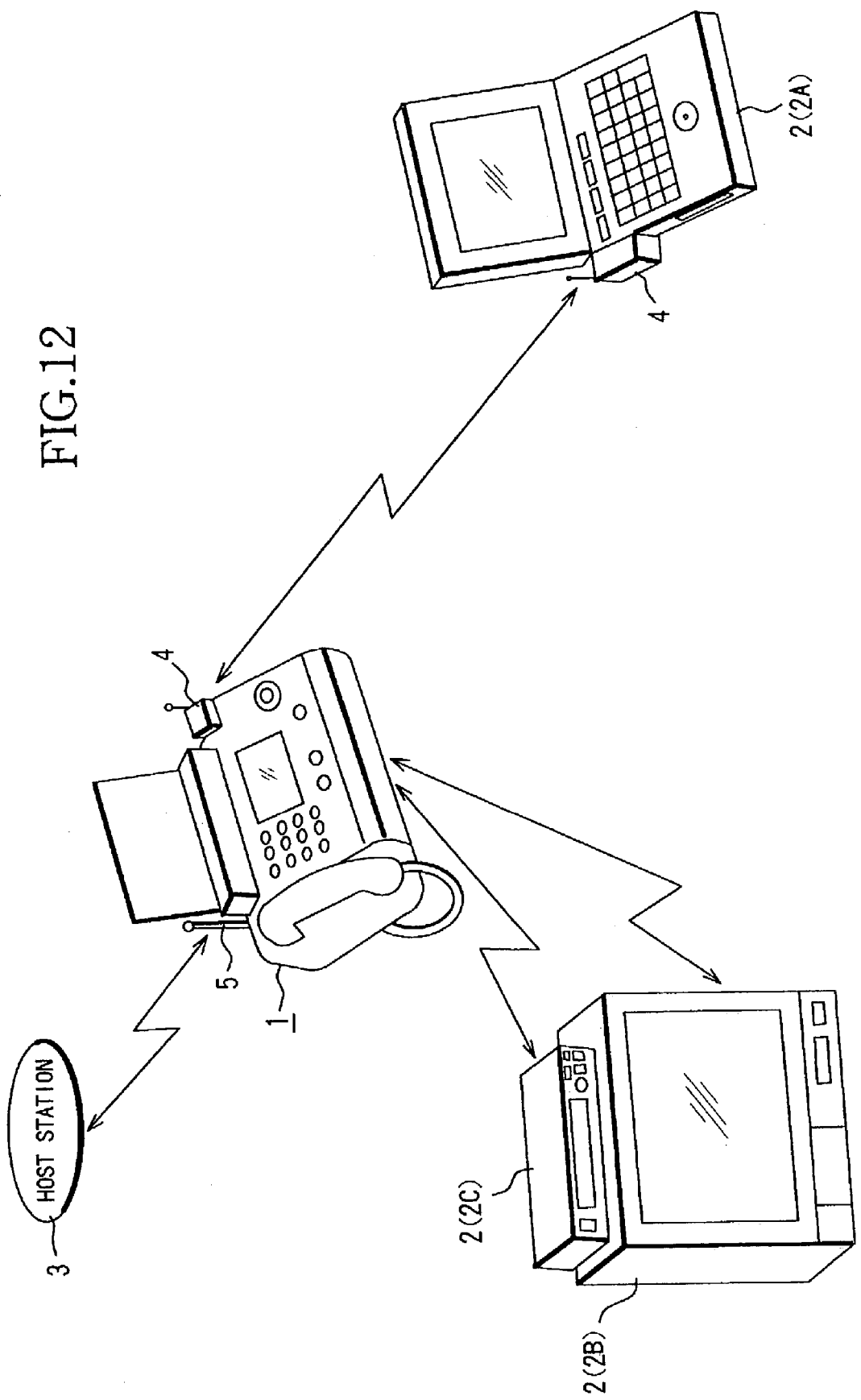
FIG. 12 is a diagram explaining a specific example in which the master communication device and the slave communication devices are applied to various types of electronic apparatuses.

FIG. 12 shows a specific example in which the aforementioned master communication device 1 and slave communication devices 2 are applied to various types of electronic apparatuses. In the example of FIG. 12, shown is an example of a wireless LAN in which a stationary telephone with a facsimile is used as the master communication device 1, a personal computer (2A), a television set (2B), and a VCR (2C) are used as the slave communication devices 2, respectively, and these are interconnected in a network.

With the wireless LAN configured in this manner, the telephone with a facsimile serving as the master communication device 1 normally performs wireless telephone communication with a telephone apparatus outside the LAN, and as required, performs the aforementioned terminating control delegation based on operations and the like on an operation input section of the master communication device 1 or a telephone apparatus outside the LAN, thereby making it possible to connect communication between that telephone apparatus and the slave communication device 2. Also, the aforementioned originating control delegation is performed based on operations and the like on the operation input section of the slave communication device 2 and that slave communication device 2 solely performs originating to a telephone apparatus outside the LAN to allow establishment of wireless telephone communication through the host station 3.

Therefore, various uses are allowed, for example, when a large amount of data which cannot be received by the master communication device 1 (the telephone with a facsimile) is transmitted from a server device outside the LAN serving as an originating telephone apparatus through the host station 3 on the wireless telephone line, the data is received by the slave communication device 2 such as the personal computer 2A to perform display, downloading and the like, or video data for a VOD (Video On Demand) is received by the television set 2B or recorded by the VCR 2C.

INDUSTRIAL AVAILABILITY

Since the present invention is configured as described above, it is possible to provide a configuration, a control method, a control program and the like for a slave communication device in a wireless LAN system in which a single wireless channel is used, and when a telephone apparatus outside the network originates a call to the LAN, the originated call once terminates at the master communication device and wireless telephone communication can be established between that telephone apparatus and a slave communication device by themselves through a host station without relaying through the master communication device, and does not require particular processing such as authentication on the host station side, presenting extreme industrial usefulness.

What is claimed is:

1. A method comprising:
    receiving, at a wireless transceiver in a master communication device within a wireless local area network (LAN), a call from an originating telephone device outside the LAN;
    determining, at a master communication device, a telephone number of the originating telephone device and a slave communication device that the call is directed to;
    transmitting a control signal from a short-range wireless transceiver in a master communication device to a short-range wireless transceiver in a slave communication device having a wireless transceiver, the control signal comprising instructions for turning on the wireless transceiver in the slave communication device;
    turning off the wireless transceiver in the master communication device, after transmitting the control signal to the slave communication device;
    allowing the wireless transceiver in the slave communication device to use a wireless telephone line to communicate with the originating telephone device;
    receiving a status signal at the short-range wireless transceiver in the master communication device from the short-range wireless transceiver in the slave communication device indicating that communication between the wireless transceiver in the slave communication device and the originating telephone device is complete;
    turning on the wireless transceiver in the master communication device;
    transmitting a second status signal from the short-range wireless transceiver in the master communication device to the short-range wireless transceiver in the slave communication device indicating that the wireless transceiver of the master communication device is ON; and
    completing, at the master communication device, communication between the wireless transceiver in the master communication device and the originating telephone device.

2. The method of claim 1, wherein the control signal is generated by a controller in the master communication device and is transmitted from the short range wireless transceiver of the master communication device to the short-range wireless transceiver of the slave communication device when there is a need for the wireless transceiver in the slave communication device to use the wireless telephone line.

3. The method of claim 1, further comprising:
    receiving, before transmitting the control signal, a request signal at the short-range wireless transceiver in the master communication device from the short-range wireless transceiver in the slave communication device to originate a call from the wireless transceiver of the slave communication device.

4. The method of claim 3, further comprising:
    transmitting, after turning off the wireless transceiver in the master communication device, a second status signal to the short-range wireless transceiver in the slave communication device from the short-range wireless transceiver in the master device indicating that the wireless transceiver in the master communication device is OFF.

5. The method of claim 4, further comprising:
    receiving a third status signal at the short-range wireless transceiver in the master device from the short-range wireless transceiver in the slave communication device indicating that the wireless transceiver in the slave communication device is ON.

6. The method of claim 3, further comprising receiving information regarding a destination for the call in the request signal.

7. The method of claim 3, further comprising receiving information regarding the slave communication device in the request signal.

8. The method of claim 7, wherein the information related to the slave communication device includes a Media Access Control (MAC) address.

9. The method of claim 7, wherein the information related to the slave communication device includes a request for the control signal.

10. The method of claim 3, wherein the control signal includes information related to an ID number or a telephone number of the master communication device.

11. The method of claim 3, wherein the control signal includes instructions for prohibiting receiving a call at the wireless transceiver in the slave communication device.

12. The method of claim 3, wherein the control signal includes instructions for limiting origination of a call from the wireless transceiver in the slave communication device to predetermined destinations.

13. The method of claim 1, wherein the control signal includes instructions for prohibiting the slave communication device from originating a call.

14. The method of claim 1, wherein the control signal includes information about the telephone number of the originating telephone device.

15. The method of claim 1, wherein the control signal includes instructions for allowing the slave communication device to receive calls from the telephone number based on the control signal.

16. A method comprising:
receiving, at a short-range wireless transceiver in a slave communication device in a wireless Local Area Network (LAN), a first status signal from a short-range wireless transceiver in a master communication device indicating that the master communication device is in a standby state;
transmitting, from the short-range wireless transceiver in the slave communication device, a request signal to the short-range wireless transceiver in the master communication device for originating a call to a telephone apparatus outside the LAN;
receiving, at the short-range wireless transceiver in the slave communication device, a control signal from the short-range wireless transceiver in the master communication device, the control signal comprising instructions for turning on a wireless transceiver in the slave communication device;
extracting, after receiving the control signal, data from the control signal at the slave communication device;
receiving a second status signal at the short-range wireless transceiver in the slave communication device from the short-range wireless transceiver in the master communication device indicating that a wireless transceiver in the master communication device is turned OFF;
turning on the wireless transceiver in the slave communication device based on the control signal, to allow the wireless transceiver in the slave communication device to use a wireless telephone line; and
transmitting a third status signal from the short-range wireless transceiver in the slave communication device to the short-range wireless transceiver in the master communication device indicating that communication between the wireless transceiver in the slave communication device and the telephone apparatus is complete.

17. The method of claim 16, further comprising:
transmitting, after turning on the wireless transceiver in the slave communication device, a fourth status signal to the short-range wireless transceiver in the master communication device from the short-range wireless transceiver in the slave communication device indicating that the wireless transceiver in the slave communication device is ON.

18. The method of claim 17, further comprising:
originating a call to the telephone apparatus from the wireless transceiver in the slave communication device.

19. The method of claim 18, further comprising:
turning off the wireless transceiver in the slave communication device in response to determining that communication between the wireless transceiver in the slave communication device and the telephone apparatus is completed;
transmitting a fifth status signal to the short-range wireless transceiver in the master communication device from the short-range wireless transceiver in the slave communication device indicating that the wireless transceiver in the slave communication device is OFF; and
receiving a sixth status signal at the short-range wireless transceiver in the slave device from the short-range wireless transceiver in the master communication device indicating that the wireless transceiver in the master communication device is ON.

20. The method of claim 16, further comprising:
performing, at the slave communication device, location registration with a base station.

21. A slave communication device comprising:
a short-range wireless transceiver configured to communicate with a master communication device within a wireless Local Area Network (LAN);
a wireless transceiver configured to communicate with a telephone device outside the LAN; and
a controller configured to control the wireless transceiver;
wherein the slave communication device is configured to:
receive, at the short-range wireless transceiver in the slave communication device, a first status signal from the master communication device indicating that the master communication device is in a standby state;
transmit, from the short-range wireless transceiver in the slave communication device, a request signal to the master communication device for originating a call to a telephone device outside the LAN;
receive, at the short-range wireless transceiver in the slave communication device, an originating control delegation signal from the master communication device in response to the request signal;
extract, using the controller in the slave communication device, after receiving the originating control delegation signal, data from the originating control delegation signal;
receive, at the short-range wireless transceiver in the slave communication device, a second status signal from the master communication device indicating that the wireless transceiver of the master communication device is turned OFF;
transmit, from the short-range wireless transceiver in the slave communication device, a third status signal to the master communication device indicating that communication between the slave communication device and the telephone device is complete; and communicate, using the short-range wireless transceiver in the slave communication device, via a wireless telephone line in response to determining that the master communication device is in a second state, in which the wireless transceiver of the master communication device is OFF and the wireless transceiver of the slave communication device is ON.

22. The slave communication device of claim 21, wherein the slave communication device is configured to:
turn on, using the controller in the slave communication device, the wireless transceiver in the slave communication device based on the second status signal from the master communication device;
transmit, from the short-range wireless transceiver in the slave communication device, after turning on the wireless transceiver in the slave communication device, a fourth status signal to the master communication device indicating that the wireless transceiver in the slave communication device is ON; and
originate, using the wireless transceiver in the slave communication device, the call to the telephone device.

23. The slave communication device of claim 22, wherein the slave communication device is further configured to:
turn off, using the controller in the slave communication device, the wireless transceiver in the slave communication device in response to determining that the call to the telephone device is terminated;
transmit, from the short-range wireless transceiver in the slave communication device, a fifth status signal to the master communication device indicating that the wireless transceiver in the slave communication device is OFF; and
receive, at the short-range wireless transceiver in the slave communication device, a sixth status signal from the master communication device indicating that the wireless transceiver in the master communication device is ON.

24. A system comprising:
a plurality of slave communication devices within a wireless Local Area Network (LAN),
wherein the plurality of slave communication devices comprise:
a short-range wireless transceiver configured to communicate with a master communication device within the LAN;
a wireless transceiver configured to communicate with a telephone apparatus outside the LAN; and
a controller configured to control the wireless transceiver;
wherein the master communication device comprises a short-range wireless transceiver configured to communicate with the plurality of slave communication devices within the LAN, a wireless transceiver configured to communicate with a telephone apparatus outside the LAN, and a controller configured to control the wireless transceiver,
wherein the master communication device is configured to use a control signal to switch between a first state, in which the wireless transceiver of the master communication device is ON and at least one wireless transceiver of the plurality of slave communication devices are OFF, and a second state in which the wireless transceiver of the master communication device is OFF and at least one wireless transceiver of the plurality of slave communication devices is ON, to allow the at least one of the plurality of slave communication device to use a wireless telephone line, and
wherein the master communication device is configured to receive a status signal from the slave communication device indicating that communication between the slave communication device and a telephone apparatus outside the LAN is complete.

25. A non-transitory computer-readable medium having instructions stored thereon, the instructions comprising:
instructions for receiving at a master communication device within a wireless Local Area Network (LAN) a call from an originating telephone device outside the LAN;
instructions for determining at the master communication device a telephone number related to the originating telephone device;
instructions for determining at the master communication device a slave communication device that the call is directed to;
instructions for receiving a request at the master communication device from the slave communication device requesting to originate a call to the originating telephone device;
instructions for transmitting a control signal from the master communication device to the slave communication device;
instructions for allowing the slave communication device to turn on a wireless transceiver in the slave communication device after transmitting the control signal to the slave communication device;
instructions for turning off a wireless transceiver in the master communication device, after transmitting the control signal to the slave communication device, to allow the slave communication device to use a wireless telephone line;
instructions for transmitting, after turning off the wireless transceiver of the master communication device, a first status signal from the master communication device to the slave communication device indicating that the wireless transceiver of the master communication device is turned OFF;
instructions for receiving a second status signal at the master communication device from the slave communication device indicating that the wireless transceiver of the slave communication device is turned ON;
instructions for receiving a third status signal at the master communication device from the slave communication device indicating that communication between the slave communication device and the originating telephone device is complete; and
instructions for transmitting a fourth status signal from the master communication device to the slave communication device indicating that the wireless transceiver in the master communication device is turned OFF; and
instructions for receiving at the master communication device a fifth status signal from the slave communication device indicating that the wireless transceiver of the slave communication device is turned ON.

26. The non-transitory computer-readable medium of claim 25, wherein the instructions further comprise:
instructions for receiving a sixth status signal at the master communication device from the slave communication device indicating that a wireless transceiver of the slave communication device is turned OFF;
instructions for turning on the wireless transceiver of the master communication device; and
instructions for transmitting a seventh status signal to the slave communication device from the master communication device indicating that the wireless transceiver of the master communication device is turned ON.

27. An article of manufacture including a memory having instructions stored thereon, the instructions that, if executed by a computing device, cause the computing device to perform operations comprising:
receiving a first status signal at a slave communication device in a wireless Local Area Network (LAN) from a master communication device indicating that the master communication device is in a standby state;
transmitting a request signal from the slave communication device to the master communication device requesting to originate a call to a telephone device outside the LAN;
receiving, at the slave communication device, a control signal from the master communication device to allow the slave communication device to turn on a wireless transceiver in the slave communication device;
receiving a second status signal at the slave communication device from the master communication device indicating that a wireless transceiver of the master communication device is turned OFF;
turning on a wireless transceiver in the slave communication device based on the control signal, to allow the slave communication device to use a wireless telephone line;
transmitting, after turning on the wireless transceiver in the slave communication device, a status signal from the slave communication device to the master communication device indicating that a wireless transceiver of the slave communication device is turned ON;
originating a call from the wireless transceiver of the slave communications device to the telephone device; and
transmitting a third status signal from the slave communication device to the master communication device indicating that communication between the slave communication device and the telephone device is complete.

28. The article of manufacture of claim 27, wherein the instructions further comprise:
instructions for receiving, before turning on the wireless transceiver, a fifth status signal at the slave communication device from the master communication device indicating that the wireless transceiver of the master communication device is turned OFF; and
instructions for transmitting, after turning on the wireless transceiver in the slave communication device, a sixth status signal from the slave communication device to the master communication device indicating that the wireless transceiver of the slave communication device is turned on.

29. The article of manufacture of claim 27, wherein the instructions further comprise:
turning off the wireless transceiver of the slave communication device if the call is terminated;
transmitting a fifth status signal to the master communication device from the slave communication device indicating that the wireless transceiver of the slave communication device is turned OFF; and
receiving a sixth status signal at the slave communication device from the master communication device indicating that the wireless transceiver of the master communication device is turned on.

* * * * *

UNITED STATES PATENT AND TRADEMARK OFFICE
CERTIFICATE OF CORRECTION

PATENT NO. : 7,969,918 B2  
APPLICATION NO. : 10/221748  
DATED : June 28, 2011  
INVENTOR(S) : Takatori et al.

Page 1 of 1

It is certified that error appears in the above-identified patent and that said Letters Patent is hereby corrected as shown below:

Title page, item (56), under "Other Publications", in Column 2, Line 1, delete "Standardfor" and insert -- Standard for --.

Column 22, line 46, in Claim 2, delete "short range" and insert -- short-range --.

Signed and Sealed this
Eighth Day of November, 2011

David J. Kappos
*Director of the United States Patent and Trademark Office*